US008739711B2

(12) United States Patent
 Cote

(10) Patent No.: US 8,739,711 B2
(45) Date of Patent: Jun. 3, 2014

(54) MICRO-OPTIC SECURITY DEVICE

(75) Inventor: Paul F. Cote, Hollis, NH (US)

(73) Assignee: Crane Security Technology, Inc., Nashua, NH (US)

(*) Notice: Subject to any disclaimer, the term of this patent is extended or adjusted under 35 U.S.C. 154(b) by 1159 days.

(21) Appl. No.: 12/671,245

(22) PCT Filed: Aug. 1, 2008

(86) PCT No.: PCT/US2008/009325
§ 371 (c)(1),
(2), (4) Date: Nov. 5, 2010

(87) PCT Pub. No.: WO2009/017824
PCT Pub. Date: Feb. 5, 2009

(65) Prior Publication Data
US 2011/0036282 A1   Feb. 17, 2011

Related U.S. Application Data

(60) Provisional application No. 60/953,304, filed on Aug. 1, 2007.

(51) Int. Cl.
 *D05B 93/00* (2006.01)
(52) U.S. Cl.
 USPC ........................................................ 112/402
(58) Field of Classification Search
 USPC ............ 112/402, 403, 405, 417, 418; 428/29, 428/30, 194, 196, 201, 203, 336; 340/572.1, 572.8, 5.86; 235/454, 235/462.01, FOR. 101; 359/2, 708, 718, 359/721, 619, 620, 621, 626
See application file for complete search history.

(56) References Cited

U.S. PATENT DOCUMENTS

| | | | |
|---|---|---|---|
| 3,268,238 A | 8/1966 | Finkel | |
| 5,712,731 A | 1/1998 | Drinkwater et al. | |
| 5,828,495 A | 10/1998 | Schindler | |
| 5,847,808 A | 12/1998 | Goggins | |
| 5,941,186 A * | 8/1999 | Argentino | 112/441 |
| 6,046,848 A | 4/2000 | Gulick, Jr. | |
| 6,185,042 B1 | 2/2001 | Lomb et al. | |
| 6,366,281 B1 | 4/2002 | Lipton et al. | |
| 6,448,984 B1 * | 9/2002 | Smith et al. | 715/781 |
| 6,805,926 B2 * | 10/2004 | Cote et al. | 428/29 |
| 6,974,080 B1 * | 12/2005 | Goggins | 235/462.01 |
| 7,070,278 B2 | 7/2006 | Pezzaniti | |
| 7,142,366 B2 | 11/2006 | Okada et al. | |
| 7,205,526 B2 | 4/2007 | Li et al. | |
| 7,243,951 B2 * | 7/2007 | Cote et al. | 283/72 |
| 7,333,268 B2 | 2/2008 | Steenblik et al. | |

(Continued)

FOREIGN PATENT DOCUMENTS

| | | |
|---|---|---|
| DE | 102005062132 | 5/2007 |
| JP | 2005-516829 | 6/2005 |

(Continued)

*Primary Examiner* — Tejash Patel
(74) *Attorney, Agent, or Firm* — Holland & Bonzagni, P.C.; Mary R. Bonzagni, Esq.

(57) ABSTRACT

A micro-optic security device that employs one or more planar arrangements of stitched icons and that projects at any given viewing angle one or more synthetically magnified images, is provided. The synthetically magnified image(s) constitutes either a single or multipart image(s) that optionally changes to a different image(s) as the security device is tilted, or as the viewing angle changes.

43 Claims, 16 Drawing Sheets

(56) References Cited

U.S. PATENT DOCUMENTS

| | | | |
|---|---|---|---|
| 7,545,566 B2 * | 6/2009 | Tomczyk | 359/619 |
| 7,699,350 B2 | 4/2010 | Heim | |
| 7,738,175 B2 * | 6/2010 | Steenblik et al. | 359/619 |
| 2003/0112523 A1 | 6/2003 | Daniell | |
| 2006/0056022 A1 | 3/2006 | Yeo et al. | |
| 2006/0227427 A1 | 10/2006 | Dolgoff | |
| 2008/0036196 A1 | 2/2008 | Steenblik et al. | |
| 2008/0165423 A1 | 7/2008 | Steenblik et al. | |
| 2008/0212192 A1 | 9/2008 | Steenblik et al. | |
| 2008/0212193 A1 | 9/2008 | Steenblik et al. | |
| 2009/0021840 A1 | 1/2009 | Steenblik et al. | |

FOREIGN PATENT DOCUMENTS

| | | |
|---|---|---|
| JP | 2007-508573 | 4/2007 |
| WO | WO 2005/031687 | 4/2005 |
| WO | WO2005/052650 | 6/2005 |
| WO | WO2005/106601 | 11/2005 |
| WO | WO2006/087138 | 8/2006 |

* cited by examiner

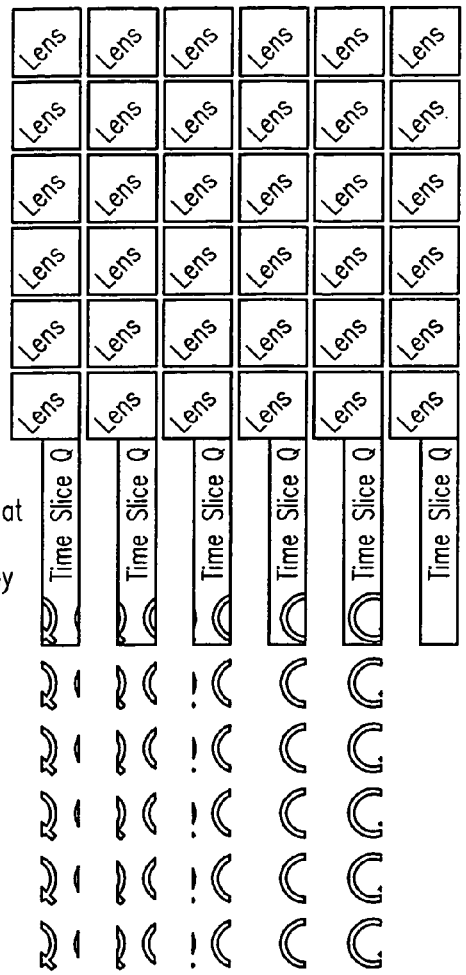
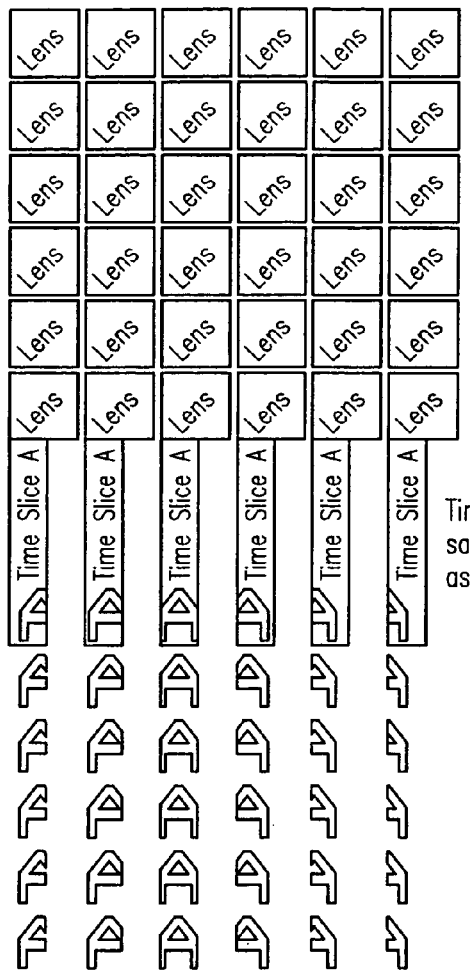
Time Slices at same period as lens array
Slices taken from item array at same period as lens.
Alternating slices from different icon arrays combined to make final array.
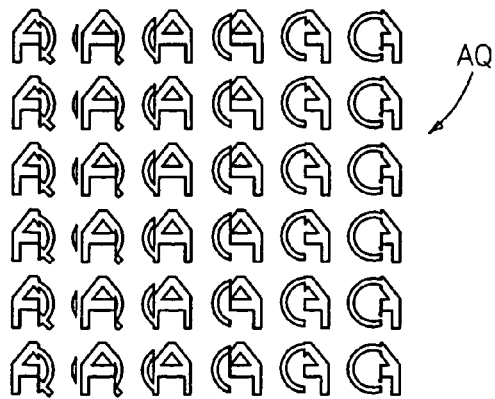
AQ
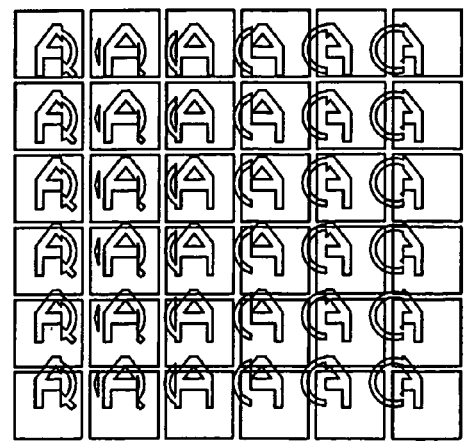
FIG. 2

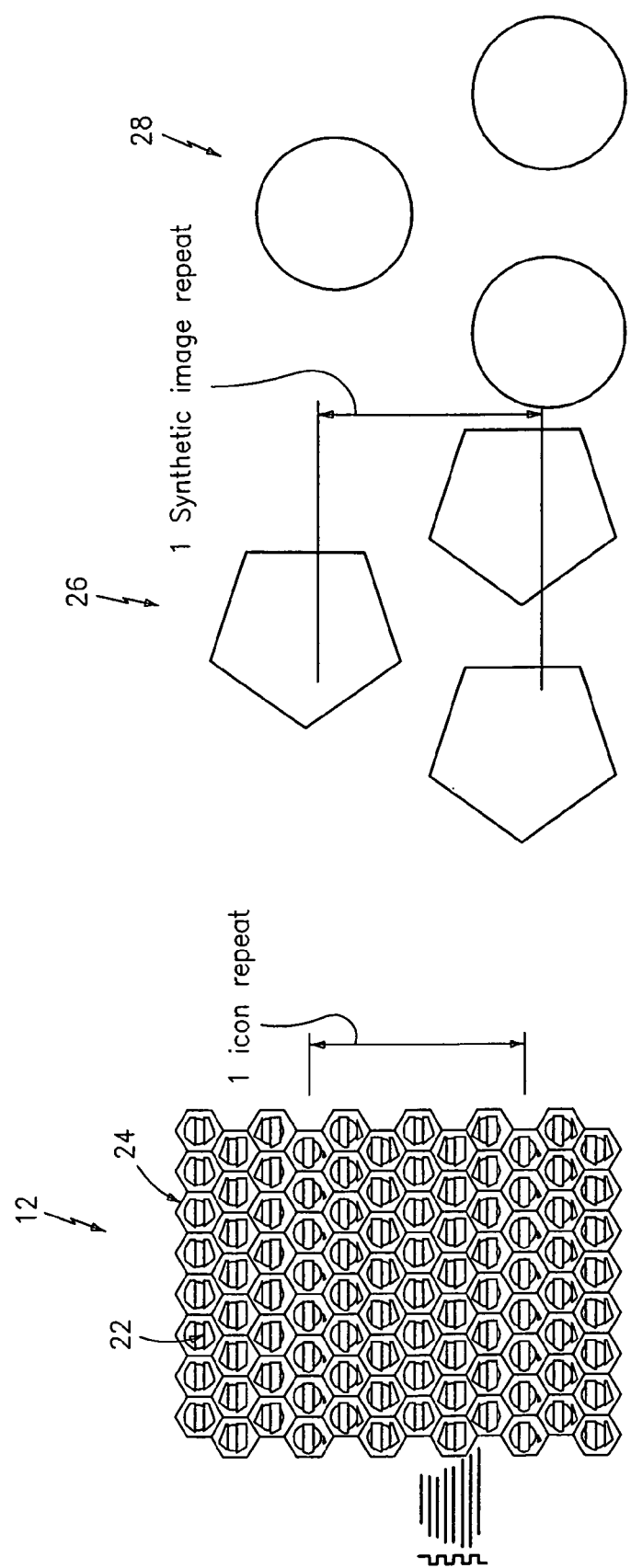

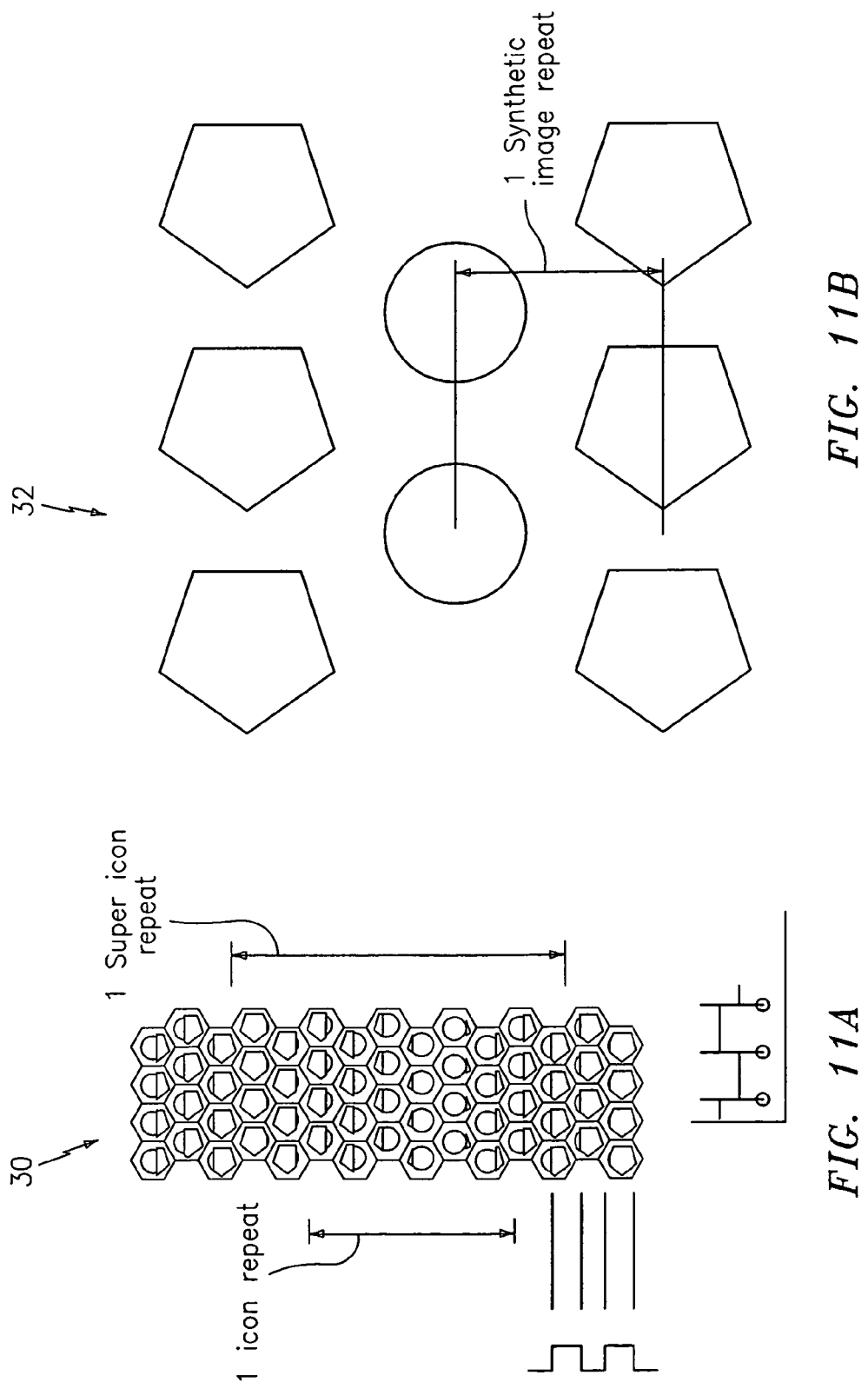

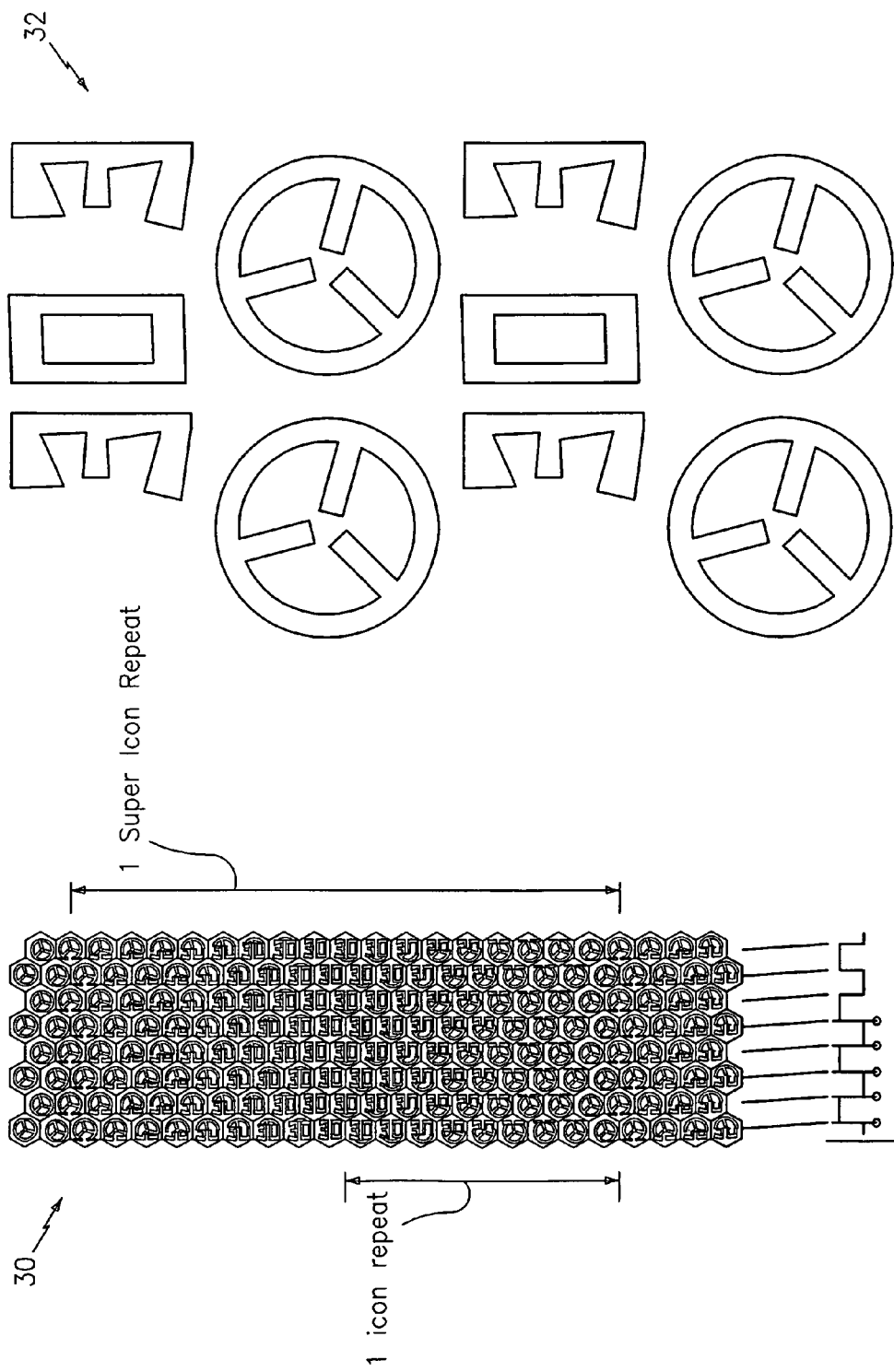

MICRO-OPTIC SECURITY DEVICE

RELATED APPLICATION

This application claims benefit of and priority to U.S. Provisional Patent Application Ser. No. 60/953,304 filed Aug. 1, 2007, which is incorporated herein by reference in its entirely.

TECHNICAL FIELD

The present invention generally relates to a micro-optic security device for projecting images, and more specifically relates to a micro-optic security device that employs one or more planar arrangements of stitched icons and that projects at any given viewing angle one or more synthetically magnified images. The synthetically magnified image(s) constitutes either a single or multipart image(s) that optionally changes to a different image(s) as the security device is tilted, or as the viewing angle changes.

BACKGROUND AND SUMMARY OF THE INVENTION

Optical materials have long been recognized as valued additions to security threads used in banknotes. These materials allow for a variety of self-authenticating optical effects while rendering the security thread and thus the banknote more resistant to counterfeiting.

By way of example, U.S. Pat. No. 7,333,268 to Steenblik et al. depicts a film material that employs a regular two-dimensional array of non-cylindrical lenses to enlarge micro-images. In one embodiment, the film material or structure comprises (a) one or more optical spacers; (b) a regular periodic planar array of image icons positioned on one surface of the optical spacer; and (c) a regular periodic array of lenses positioned on an opposing surface of the optical spacer. The lenses are described as being polygonal base multi-zonal lenses, lenses providing enlarged fields of view over the width of the associated image icons so that the peripheral edges of the associated image icons do not drop out of view, or aspheric lenses having effective base diameters of less than 50 microns. For currency, document and product security applications requiring total film thicknesses of less than 50 microns, this reference teaches that the effective base diameter of the lens must be less than 50 microns, and that the focal length of the lens must be less than 40 microns. The images projected by this film structure reportedly show a number of visual effects including orthoparallactic movement.

These micro-optic film structures, in the form of security strips or threads, are either mounted on a surface of a security document (e.g., banknote), or are partially embedded within the document, with the film structures being visible in clearly defined windows on a surface of the document.

Synthetically magnified images which transform from one form, shape, size and/or color into a different form, shape, size and/or color as the film structure is either azimuthally rotated or viewed from different viewpoints are described in this reference. One such method for causing one synthetically magnified image to transform into another synthetically magnified image involves an abrupt change from one icon element pattern to another. As best shown in FIGS. 6a-c of this reference, icon element patterns 92 and 94, while separated on either side of a hard boundary 104, are joined together on the boundary line. As a result, transformation occurs abruptly at this boundary line. Another method described in this reference involves a less abrupt change. In this method, a transition zone is used in the icon array where the size and shape of two icons, which are arranged side-by-side under each lens, gradually change (i.e., either gradually evolving into a larger and more advanced form, or gradually reverting to a smaller and less advanced form) as one moves across the array. While the abruptness of the change is softened by the use of a transition zone, the extent to which the smoothness of synthetic image transformations can be improved, as well as the number and complexity of these image transformations is limited where only two intact icons are involved in each transformation and where the transformations do not occur continuously but rather only during a portion of the time in which the film structure is rotated or viewpoints changed. A need therefore exists for a security device that is capable of more seamlessly transforming projected images into one or several different images along its horizontal and/or vertical axis. A need also exists for a security device that is capable of projecting more than one image at any given viewing angle thereby allowing for the formation of complex, integrated images that are more resistant to simulation.

International Patent Application No. PCT/GB2005/001618 to Commander et al. describes a security device that comprises a substrate having an array of microlenses on one side and one or more corresponding arrays of microimages on the other side. The distance between the microlens array and the microimage array(s) is substantially equal to the focal length of the microlenses. The substrate is sufficiently transparent to enable light to pass through the microlenses so as to reach the microimages. Each microimage is defined by an anti-reflection structure (e.g., a moth-eye structure) on the substrate, which is formed by a periodic array of identical structural elements and an at least partially reflecting layer. Microimages are formed by one or both of the anti-reflection structure and the at least partially reflecting layer. Light passing through the substrate and impinging on the microimages is reflected to a different extent than light which does not impinge on the microimages, thereby rendering the microimages visible.

In an effort to mask variations in orientation and magnification across the device that occur during manufacture, this reference teaches introducing deliberate variations in the image array. One such variation involves modifying the individual images within the microimage array so as to effect a slow rotation in the image across the array (see page 35, lines 23 to 31, and FIG. 42, of PCT/GB2005/001618). Another such variation is described only as changing the shape of the images (see page 35, lines 31 to 33, of PCT/GB2005/001618). Means for achieving such a change in the shape of the images is not disclosed.

A general object of the present invention is to address the needs presented by the prior art by providing stitched icons made up of slices (i.e., narrow bands or strips) from one or more icon designs, wherein each slice is spaced slightly apart from, abuts (i.e., touches or joins at an edge or border), or slightly overlaps an adjacent slice(s), and by further providing a micro-optic security device which employs one or more planar arrangements of such stitched icons. The inventive security device projects at any given viewing angle one or more synthetically magnified images.

The term "frequency", as used herein, means the number of slices that are present in a stitched icon. By way of example, a stitched icon that has a frequency of 4 means that the stitched icon contains four (4) interleaved slices, and has a period of ¼, while a stitched icon that has a frequency of 2 means that the stitched icon contains two (2) adjacent slices, and has a period of ½.

The micro-optic security device of the present invention comprises a substrate, one or more planar arrangements of stitched icons on or within a surface of the substrate, and one or more planar arrangements of microlenses disposed substantially parallel to the planar arrangement(s) of stitched icons at a distance sufficient for the microlenses to form synthetically magnified images of the icon design(s) embodied in the stitched icons. The size and period of the icon design(s) embodied in the stitched icons can be (in the x and/or y directions) equal to or larger than the size and period of the microlenses. In other words, there may or may not be a one-to-one correlation between the icon design(s) embodied in the stitched icons and the microlenses. This allows for the synthetic display of icon designs that do not "fit" within the boundaries defined by a single microlens period.

In a first contemplated embodiment, the stitched icons are made up of abutting or slightly overlapping slices. By way of the present invention, it has been discovered that a micro-optic security device which employs one or more planar arrangements of stitched icons made up of at least one slice (e.g., vertical slice) from two or more icon designs (the slices abutting or slightly overlapping adjacent slices) will simultaneously project two or more synthetically magnified images. Such simultaneously projected images may be arranged side-by-side to form, for example, a unique pattern or a legible phrase, or may be linked together to form a single, larger, more detailed image. Moreover, such simultaneously projected images may change to one or more different images as the security device is tilted, or as the viewing angle changes.

In a second contemplated embodiment, the stitched icons are made up of slightly spaced apart slices. By way of the present invention, it has been discovered that a micro-optic security device which employs one or more planar arrangements of stitched icons each made up of slightly spaced apart slices (e.g., vertical slices) from two or more icon designs will successively project two or more synthetically magnified images as the device is tilted or viewed from different viewing angles.

In addition to (or instead of) changing from one form to another as the device is tilted or viewed from different viewing angles, the synthetically magnified image(s) projected by the inventive security device may show a number of other visual effects, such as orthoparallactic movement, appearing to lie on a spatial plane deeper than the thickness of the security device, and/or appearing to lie on a spatial plane above a surface of the security device. For example, a first projected image (image A) may appear to lie on a spatial plane deeper than the thickness of the security device before changing to a second projected image (image B), which appears to lie on a spatial plane above a surface of the security device. Image B may then change to a third projected image (image C), which gives an impression of orthoparallactic movement. When two or more images are simultaneously projected, these images may also appear to rapidly switch or trade places.

As will be described in more detail below, the synthetically magnified images projected by the inventive security device may also be animated images that appear to move in a continuous motion.

In a first preferred embodiment, the inventive security device comprises an elongated substrate having a long axis and a short axis and a planar array of stitched icons positioned on or within a surface of the substrate, the planar array having an axis of symmetry within its plane. The stitched icons, each made up of adjacent or interleaved slices from two or more icon designs, are arranged in a plurality of mutually perpendicular columns and rows, and have a repeat period within the planar array. The icon designs or portions thereof embodied in the slices that make up each stitched icon change or transition (in terms of size, shape and/or position) either down each column or across each row. A corresponding planar array of microlenses, having an axis of symmetry within its plane, is disposed substantially parallel to the planar array of stitched icons with the focal points of at least some of the microlenses being substantially aligned with slices in the stitched icons. The distance between the planar arrays is sufficient for the microlenses to form synthetically magnified images of the transitioning icon designs embodied in the slices. The microlenses have a repeat period within the planar array.

The planar arrangement of stitched icons in this first preferred embodiment allows the synthetically magnified image (s) to smoothly transition from one form to at least one other form and then, optionally, back to the original form, in either the horizontal direction or the vertical direction.

In a more preferred embodiment, the ratio of the repeat period of the stitched icons to the repeat period of the microlenses in at least one direction is substantially equal to 1, and the axis of symmetry of the planar array of stitched icons and the corresponding axis of symmetry of the planar array of microlenses are rotationally misaligned, thereby providing orthoparallactic motion effects for the synthetically magnified images of the transitioning icon designs embodied in the slices. In other words, as the security device is tilted, the magnified image changes or evolves as it moves in a direction of tilt that appears to be perpendicular to the direction anticipated by normal parallax.

The rotational misalignment or small pitch mismatch allows a viewer to observe a different part of the transitioning icon designs in each neighboring lens giving the impression that the gradually evolving magnified image is in a different position. As the viewer's eye moves smoothly across the rotationally misaligned arrays, the magnified image, which is orientated at a 90° angle relative to the stitched icons in the planar array, gradually changes form while giving the impression that it is moving orthoparallactically relative to the surface.

In another more preferred embodiment, the ratio of the repeat period of the stitched icons to the repeat period of the microlenses in at least one direction is greater than 1 and the axis of symmetry of the planar array of stitched icons and the corresponding axis of symmetry of the planar array of microlenses are aligned, thereby providing a floating effect for the synthetically magnified images of the transitioning icon designs. In other words, as the security device is tilted, the magnified image changes or evolves while appearing to lie on a spatial plane above a surface of the security device.

In yet another more preferred embodiment, the ratio of the repeat period of the stitched icons to the repeat period of the microlenses in at least one direction is less than 1 and the axis of symmetry of the planar array of stitched icons and the corresponding axis of symmetry of the planar array of microlenses are aligned, thereby providing a deep-set or sunken effect for the synthetically magnified images of the transitioning icon designs. In other words, as the security device is tilted, the magnified image changes or evolves while appearing to lie on a spatial plane deeper than the thickness of the security device.

In a second preferred embodiment, the stitched icons are again made up of adjacent or interleaved slices from two or more icon designs, but placement or interleaving of the slices is done at an angle. More specifically, the inventive micro-optic security device comprises an elongated substrate having a long axis and a short axis and an angled planar array of similarly angled stitched icons positioned on or within a surface of the substrate, the planar array having an axis of symmetry within its plane. The stitched icons are arranged in a plurality of columns and rows and have a repeat period within the planar array. The icon design or portions thereof embodied in each slice in each stitched icon changes or transitions (in terms of size, shape and/or position) either down each column or across each row. A corresponding planar array of microlenses having an axis of symmetry within its plane is disposed substantially parallel to the planar array of stitched icons at a distance sufficient for the microlenses to form synthetically magnified images of the transitioning icon designs. As noted above, the focal points of at least some of the microlenses are substantially aligned with slices in the stitched icons. The microlenses have a repeat period within the planar array.

The novel planar arrangement of stitched icons in this second preferred embodiment allows the synthetically magnified image(s) to smoothly transition from one form to at least one other form and then, optionally, back to the original form, in both the horizontal direction and the vertical direction.

In a more preferred embodiment, the stitched icons are arranged in a plurality of columns and rows in which the rows are parallel to the short axis, while the columns are at an angle (relative to the long axis) ranging from greater than 0 to less than 90°, the ratio of the repeat period of the stitched icons to the repeat period of the microlenses in at least one direction is substantially equal to 1, and the axis of symmetry of the planar array of stitched icons and the corresponding axis of symmetry of the planar array of microlenses are rotationally misaligned, thereby providing the synthetically magnified images of the transitioning icon designs, which are orientated at a 90° angle relative to the stitched icons in the planar array, with orthoparallactic motion effects.

In another more preferred embodiment, the stitched icons are again arranged in a plurality of columns and rows in which the rows are parallel to the short axis, while the columns are again at an angle (relative to the long axis) ranging from greater than 0 to less than 90°. The ratio of the repeat period of the stitched icons to the repeat period of the microlenses in at least one direction, however, is greater than 1, and the axis of symmetry of the planar array of stitched icons and the corresponding axis of symmetry of the planar array of microlenses are aligned, thereby providing a floating effect to the synthetically magnified images of the transitioning icon designs.

In yet another preferred embodiment, the stitched icons are again arranged in a plurality of columns and rows in which the rows are parallel to the short axis, while the columns are again at an angle (relative to the long axis) ranging from greater than 0 to less than 90°. The ratio of the repeat period of the stitched icons to the repeat period of the microlenses in at least one direction, however, is less than 1, and the axis of symmetry of the planar array of stitched icons and the corresponding axis of symmetry of the planar array of microlenses are aligned, thereby providing a deep-set or sunken effect to the synthetically magnified images of the transitioning icon designs.

The present invention further provides a security document or label having opposing surfaces and comprising at least one micro-optic security device, as defined above, partially embedded in and/or mounted on a surface of the security document or label.

In one contemplated embodiment, the synthetically magnified images generated by the inventive micro-optic security device are coordinated with printed images on the device itself and/or on the security document or label.

Other features and advantages of the invention will be apparent to one of ordinary skill from the following detailed description and accompanying drawings.

Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

Particular features of the disclosed invention are illustrated by reference to the accompanying drawings, in which:

FIG. 2 is a diagrammatic depiction of process steps used in the formation of one embodiment of the stitched icon array and micro-optic security device of the present invention;

FIG. 3A is a plan view of one embodiment of the security document of the present inventive with the inventive micro-optic security device partially embedded therein, depicting in a side view the synthetic image array projected by the inventive device, while

FIGS. 4A to 9A and 11A to 15A are plan or top diagrammatic views of different embodiments of the micro-optic security device of the present invention, while FIGS. 4B to 9B and 11B to 15B are plan views of the synthetically magnified image arrays projected by these inventive micro-optic security devices as the device is tilted, or as the viewing angle changes;

BEST MODE FOR CARRYING OUT THE INVENTION

By way of the present invention, it has been discovered that the use of stitched icons composed of adjacent or interleaved slices in a micro-optic security device can greatly expand the number and complexity of the visual effects offered by such devices. It has also been discovered that the configuration or arrangement of slices in a stitched icon plays a role in the number of synthetic images that may be projected at any one viewing angle by the device. In particular, it has been discovered that abutting or slightly overlapping slices allow the device to simultaneously project two or more synthetically magnified images that may be separated or linked, thereby greatly increasing the complexity of these images.

The micro-optic security device of the present invention may be utilized in a variety of different forms with any document (e.g., banknote, passport, identity card, credit card), label, means of identification, commercial product (e.g., optical disks, CDs, DVDs, packages of medical drugs), etc., for authentication purposes. As will be readily appreciated by those skilled in the art, the visual effects offered by the inventive micro-optic security device serve to greatly increase the counterfeit resistance of these products.

As noted above, the micro-optic security device of the present invention comprises a substrate, one or more planar arrangements of stitched icons on or within a surface of the substrate, and one or more planar arrangements of microlenses disposed substantially parallel to the planar arrangement(s) of stitched icons at a distance sufficient for the microlenses to form synthetically magnified images of the icon designs embodied in the stitched icons.

Figure 1:
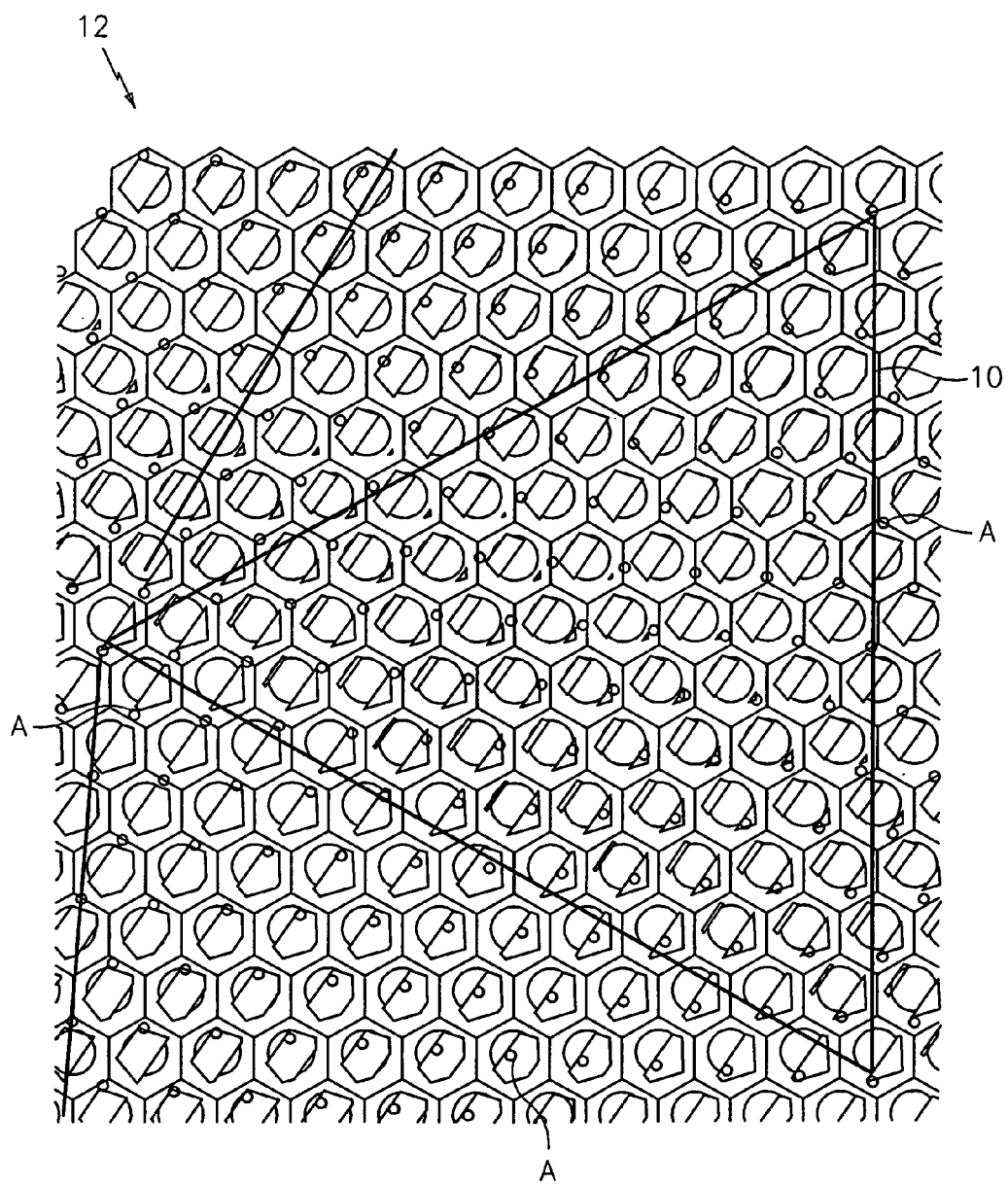
FIG. 1 is an enlarged plan or top diagrammatic view of one embodiment of the micro-optic security device of the present invention showing an imaging group of microlens/stitched icon structures defined by a triangular marking that projects one or more synthetically magnified images as the device is tilted, or as the viewing angle changes.

Groups of associated microlens and stitched icon structures ("microlens/icon structures"), which may or may not repeat across the length and/or width of the inventive security device, collectively form, magnify and project the synthetic images. By way of example, and as best shown in FIG. 1, microlens/icon structures enclosed within triangular portion 10 in one embodiment of inventive micro-optic security device 12 project one or more synthetically magnified images as the device is tilted, or as the viewing angle changes. The focal points of the microlenses shown in this drawing are represented by small circles, which are marked with the letter "A". The number of microlens/icon structures in each "imaging group" is determined by the following formula:

$$\text{number of microlens/icon structures in each imaging group} = \left[ \frac{\text{size (width} \times \text{height) of synthetically magnified image(s)}}{\text{size (width} \times \text{height) of stitched icon}} \right]^2$$

Imaging groups of the inventive security device may project images with the same or different visual effects. Simultaneously projected images or so-called "super icons" may appear upon viewing one portion of the security device, while fixed projected images and/or sequentially projected images that change from one form to another may appear upon viewing other portions of the device. In any one location, the projected images may appear to lie on a spatial plane above or below a surface of the device, or may appear to move orthoparallactically.

When the inventive micro-optic security device is in the form of a security thread, it may be partially embedded in a banknote, visible only in clearly defined windows on the banknote's surface. These windows, which typically measure from about 6 to about 21 millimeters (mm) in length and from about 3.5 to about 4.5 mm in width, allow for imaging groups ranging in number from about ½ to about 5 to be physically present in any one such window. The inventive device may be designed so that the imaging groups in each window project images having the same or different optical effects. To further increase the counterfeit resistance of the banknote, these projected images may be coordinated with printed images on the device and/or banknote.

The substrate used in the practice of the present invention is a light-transmitting polymer film that may also function as an optical spacer. The light-transmitting polymer film may be formed using one or more essentially colorless polymers selected from the group including, but not limited to, polyester, polyethylene, polyethylene terephthalate, polypropylene, polyvinyl carbonate, polyvinylidene chloride, and combinations thereof.

The thickness of the polymer film preferably ranges from about 12 to about 26 microns (more preferably from about 13 to about 17 microns).

The one or more planar arrangements of microlenses are selected from the group of:
  i. one or more planar arrangements of cylindrical or non-cylindrical lenses;
  ii. one or more planar arrangements of focusing reflectors;
  iii. one or more opaque layers containing a plurality of apertures; and
  iv. one or more reflective layers.

In a preferred embodiment, the microlenses are non-cylindrical lenses having a spheric or aspheric surface. Aspheric surfaces include conical, elliptical, parabolic and other profiles. These lenses may have circular, oval, or polygonal base geometries, and may be arranged in regular or random, one- or two-dimensional arrays. In yet a more preferred embodiment, the microlenses are aspheric lenses having polygonal (e.g., hexagonal) base geometries that are arranged in a regular, two-dimensional array on the substrate or light-transmitting polymer film.

The subject microlenses have preferred widths (in the case of cylindrical lenses) and base diameters (in the case of non-cylindrical lenses) of less than 50 microns (more preferably, less than about 45 microns, and most preferably, from about 10 to about 40 microns), preferred focal lengths of less than 50 microns (more preferably, less than about 45 microns, and most preferably, from about 10 to about 30 microns), and preferred f-numbers of less than or equal to 2 (more preferably, less than or equal to 1).

The stitched icons used in the practice of the present invention are made up of slices (i.e., narrow bands or strips) from one or more icon designs, wherein each slice is spaced slightly apart from, abuts (i.e., touches or joins at an edge or border), or slightly overlaps an adjacent slice(s). The slices may be manipulated in terms of content, spacing and/or degree of overlap to adjust or fine-tune the final projected image(s).

The icon designs used to prepare these stitched icons may be of any type of fixed or fluid graphic design including, but not limited to, positive or negative symbols, shapes, letters, numerals, text, and combinations thereof. Examples of fixed icon designs include a star, a box, a bell, a bell in combination with a number, etc., while examples of fluid icon designs include a blinking eye and a shrinking or rotating currency symbol.

To form a stitched icon, the icon designs that will make up the stitched icon are decomposed into bands or strips. The bands or strips from each icon design may then be arranged in alternating or interleaved fashion with the slices spaced apart, abutting, or slightly overlapping, to form the stitched icons. Each slice within a stitched icon is aligned behind one or more lenses at its/their focal point(s). In a preferred embodiment, computer programs are used to prepare these slices.

By way of example, and as best shown in FIG. 2, a first icon design in the form of a regular array of letter As is cut at the same period as a corresponding lens array into vertical slices, with each cut slice having a width that is slightly larger than half of the repeat period of that array. The result is a plurality of slices that each display a slightly different portion of the letter A in a slightly different position, that portion of the letter A repeating down the slice. The same process, which may be referred to as a "time slicing" process, is repeated on a second icon design in the form of a regular array of letter Qs. Alternate slices from the first and second icon designs are then recursively merged to form a regular array of stitched icons AQ, each comprised of 1 slice from the first icon design and 1 slice from the second icon design. The resulting array of stitched icons AQ represents half of the first icon design and half of the second icon design, with that portion of an icon design shown in each slice in a stitched icon changing or transitioning across each row but not down each column. The stitched icon array AQ is then combined with a lens array, which in FIG. 2 is shown as having a different period (but aligned symmetry axis) thereby providing the synthetically magnified images (letter A array ↔ letter Q array) with either a floating or deep-set or sunken effect.

As will be readily apparent to one skilled in the art, as the number of icon designs and/or slices increases, the boundary between slices in the stitched icons will appear more and more like a smooth transition, with individual slices in the stitched icons becoming less and less discernible.

Each stitched icon preferably measures from about 15 to about 30 microns in total height and from about 15 to about 30 microns in total width. The slices that make up the stitched icons each preferably measure from about 1/10 to less than about 30 microns in total width.

By way of example, for a stitched icon comprising four slices, each such slice would measure from about 4 to about 8 microns in total width.

The slices may be printed directly on the substrate. In a preferred embodiment, the slices are raised or recessed relative to a surface of the substrate. More specifically, the slices are formed as either voids or recesses in the substrate, or raised relative to the substrate. In either case, the slices may be formed by casting or heat pressure processes.

In one embodiment contemplated by the present invention, the slices are optionally coated and/or filled voids or recesses formed on or within the substrate. The voids or recesses, which are in close proximity but do not actually touch, each measure from about 0.5 to about 8 microns in total depth and from about 0.5 to about 8 microns in total width.

For those embodiments where the slices constitute filled voids or recesses, light-converting or luminescent materials may be added to the material (e.g., a substantially transparent or clear radiation curable resinous material) used to fill the recesses. These materials may be added in amounts ranging from about 2 to about 30% by weight (preferably, from about 5 to about 10% by weight), based on the total weight of the fill material. When added in particle form to the fill material, the average particle size of these light-converting or luminescent materials is less than or equal to about 2 microns (preferably, less than or equal to about 1 micron).

In addition, slices formed as recesses by a substantially transparent, colorless or light-colored resin or resinous material may be filled with one or more magnetic materials such as, for example, magnetic inks.

The planar arrangement of stitched icons used in the inventive security device preferably comprises a plurality of columns and rows, and more preferably comprises a plurality of mutually perpendicular columns and rows. As will be described in more detail below, the stitched icons may be identical or may change within the planar arrangement. For example, the stitched icons may change across each row and/or down each column, or at any angle in between. More specifically, as they progress, for example, across each row and/or down each column, the icon design(s) or portions thereof embodied in each slice in each stitched icon may (i) be present in substantially unaltered form, (ii) change in terms of location, shape, size and/or color, (iii) change or transition to at least one other form, and/or (iv) represent different perspectives (that is, views from different angular positions) of an icon design or a portion thereof, thereby providing the projected image(s) with a three-dimensional effect.

Figure 3A:
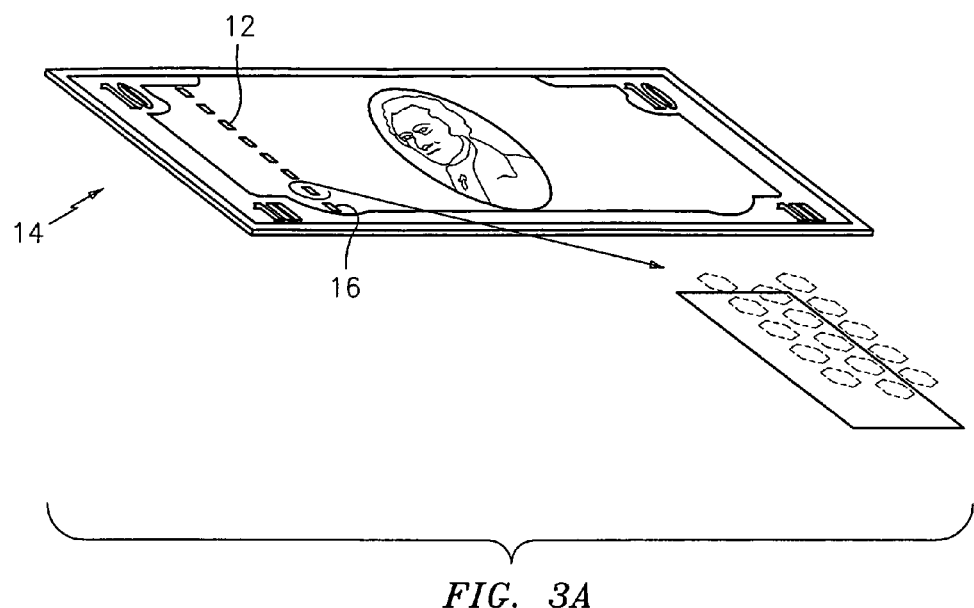
Figure 3B:
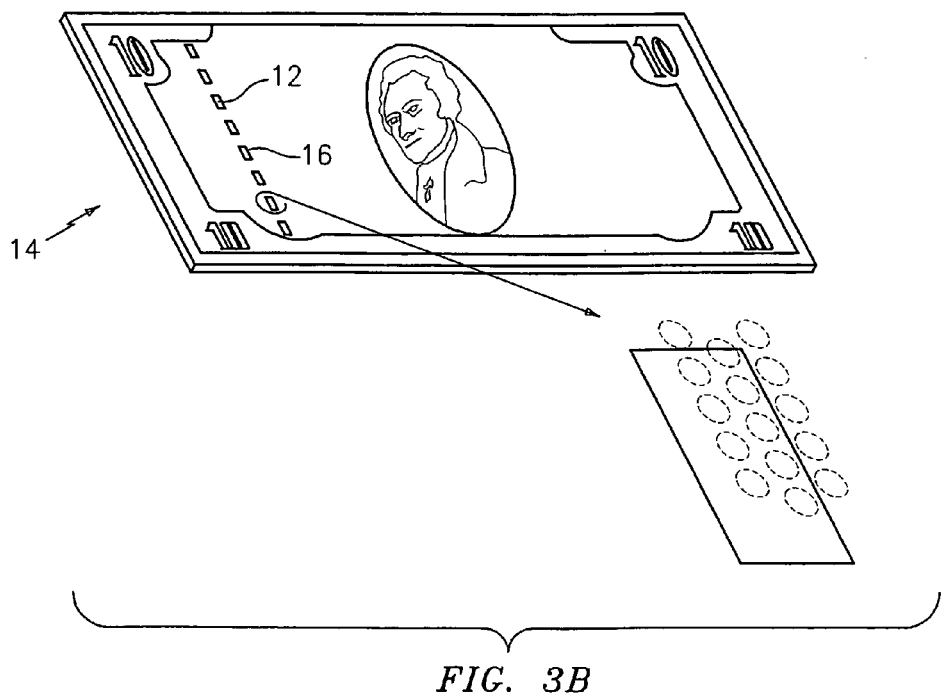
FIG. 3B is the security document of FIG. 3A rotated toward the viewer, depicting in a side view the synthetic image array projected by the inventive device at this different viewing angle.

Referring now to FIGS. 3A and 3B, an embodiment of the security document of the present invention is shown generally at 14. Security document 14 has an embodiment of micro-optic security device 12 in the form of a security thread partially embedded therein, with device 12 being visible in clearly defined windows 16. As best shown in FIG. 3A, upon viewing device 12 through windows 16 of document 14, a viewer will see an array of hexagons that appear to lie on a spatial plane above a surface of device 12. As best shown in FIG. 3B, as security document 14 is tilted toward the viewer, the array of hexagons will quickly switch to an array of circles that also appears to lie on a spatial plane above a surface of device 12.

Figure 4B:
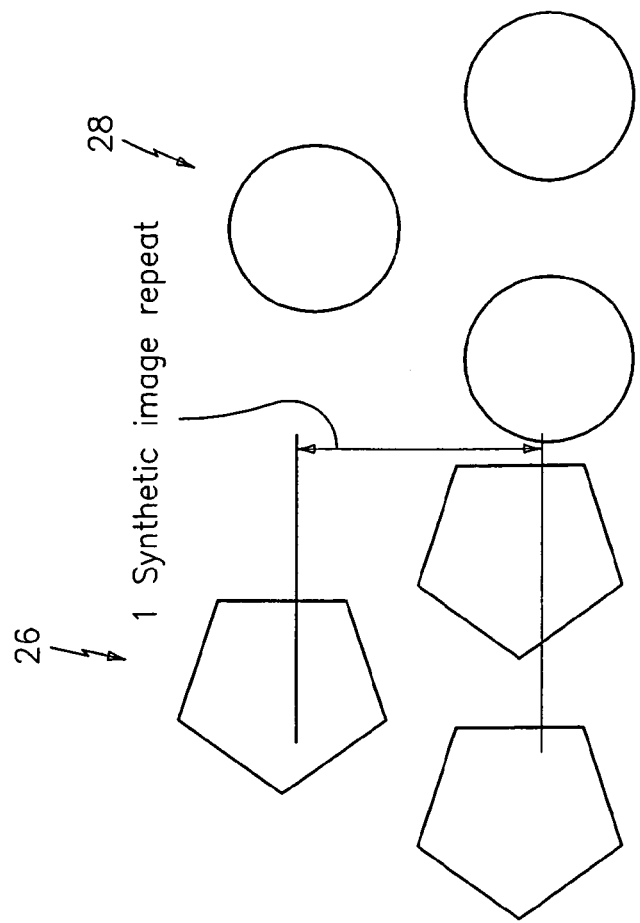
Figure 4A:
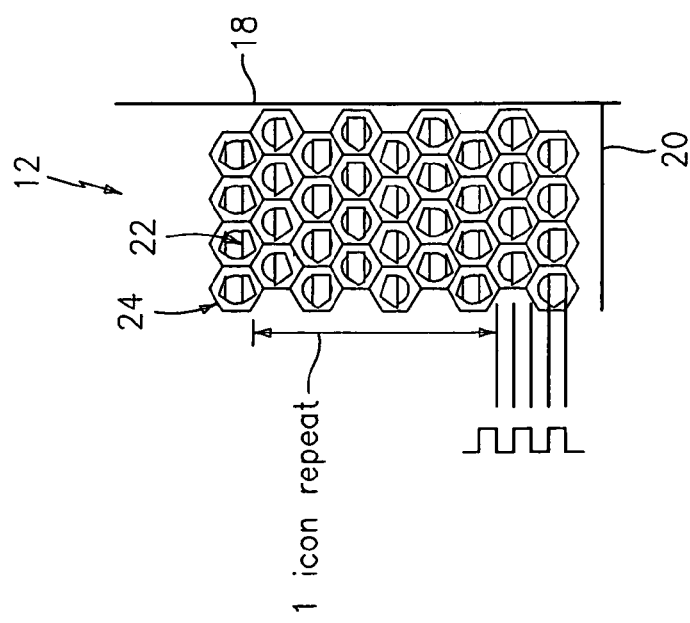

Micro-optic security device 12, which is shown separately in FIG. 4A, comprises: a substrate (not shown) having a long axis 18 and a short axis 20; a regular array of stitched icons 22, each icon 22 having a frequency of 2 and (apart from partial slices that may appear due to periodic phase changes) is basically made up of one slice from two different icon designs, one icon design in the form of a pentagon array and the other in the form of a circle array; and a regular array of microlenses 24 in the form of aspheric lenses having hexagonal base geometries. The microlens array 24 is disposed substantially parallel to the stitched icon array 22 at a distance sufficient for the microlenses to form (as shown in FIG. 4B) synthetically magnified image arrays 26, 28. Each stitched icon is symmetrical in that each icon is made up of substantially equal numbers of similarly sized slices from the two icon designs. The microlens array and the stitched icon array each have an axis of symmetry within their respective planes. Moreover, the microlenses and the stitched icons have a repeat period within their particular arrays.

The axis of symmetry of the stitched icon array 22 and the corresponding axis of symmetry of the microlens array 24 are aligned, while the ratio of the repeat period of the stitched icons to the repeat period of the microlenses in at least one direction is greater than 1. Those portions of the icon designs embodied in the slices in each stitched icon change or transition down each column of the icon array 22. As such, and as best shown in FIG. 4B, the inventive security device 12 will successively project an array of pentagons and then an array of circles that appear to lie on a spatial plane above a surface of the security device 12 as the device is tilted horizontally, or as the viewing angle changes along this plane. Due to the symmetric nature of each stitched icon, the arrays of synthetically magnified images 26, 28 appear for equal amounts of time as the device is tilted, or as the viewing angle changes.

While one particular visual effect is described for the projected images shown in FIG. 4B, other visual effects are possible. By way of example, changing the ratio of the repeat period of the stitched icons to the repeat period of the microlenses in at least one direction to less than 1 will cause the projected image arrays to appear to lie on a spatial plane below a surface of the security device 12. By way of further example, misaligning the axis of symmetry of the stitched icon array 22 and the corresponding axis of symmetry of the microlens array 24 will cause the projected image arrays to appear to move orthoparallactically. These and other possible visual effects are described in detail in U.S. Pat. No. 7,333,268 to Steenblik et al., which is incorporated in its entirety herein by reference.

Figure 5B:
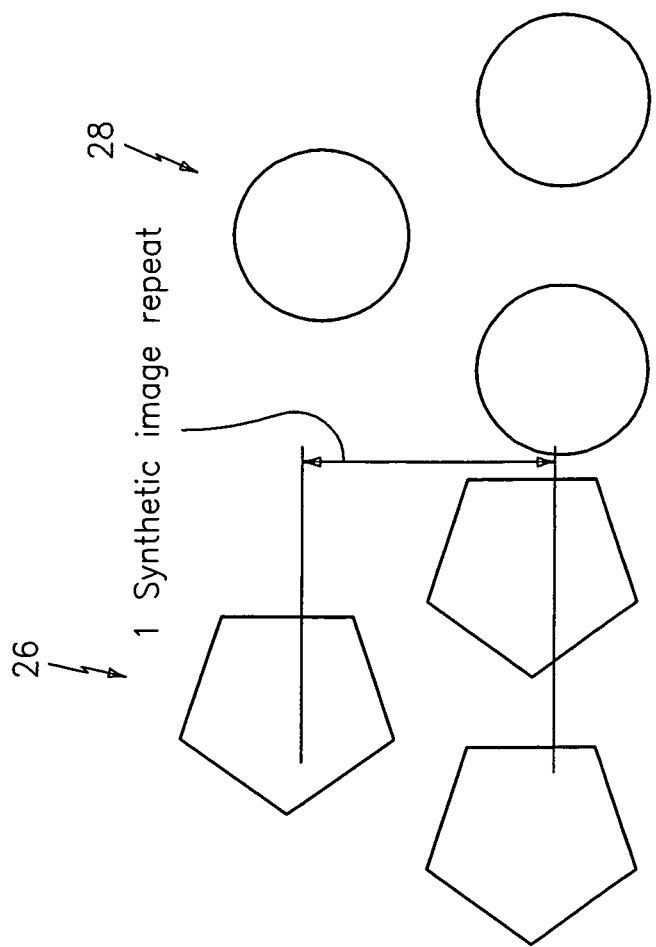
Figure 5A:
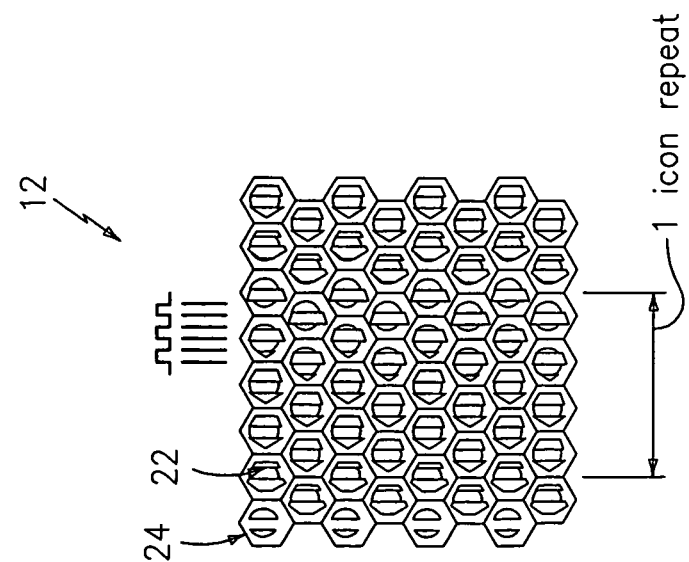

In FIG. 5A, as in the prior example, the stitched icon has a frequency of 2. Those portions of the icon designs embodied in the slices in each stitched icon change or transition across each row of the icon array 22. As such, and as best shown in FIG. 5B, the inventive security device 12 will successively project an array of pentagons 26 and then an array of circles 28 that appear to lie on a spatial plane above a surface of the security device 12 as the device is tilted vertically, or as the viewing angle changes along this plane.

Figure 6B:
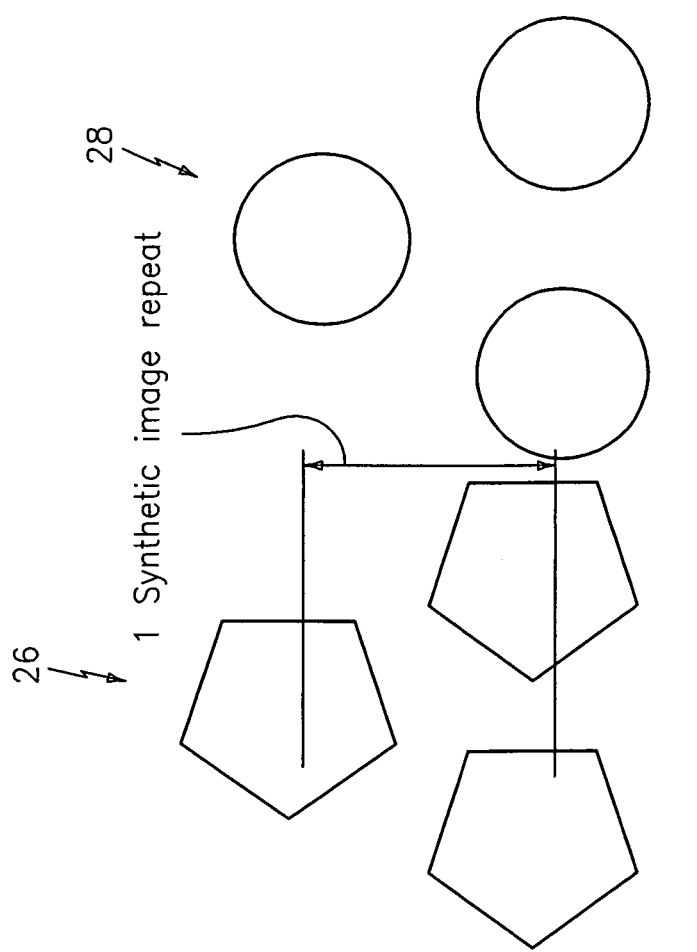
Figure 6A:
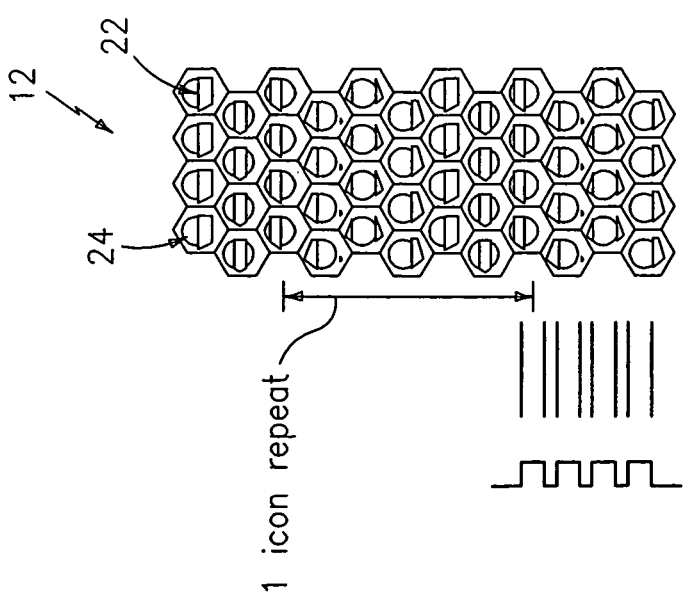

In FIG. 6A, each stitched icon has a frequency of 2 but is asymmetric in that the slices from each icon design occupy a different percentage of the total area of the stitched icon. In this drawing, the pentagon array slice(s) constitutes 25% of the total area of the stitched icon, while the circle array slice(s) constitutes 75%. Due to the asymmetric nature of each stitched icon, synthetic image 26 in the form of an array of pentagons (see FIG. 6B) would appear only 25% of the time, while synthetic image 28 in the form of an array of circles would appear 75% of the time, as the device is tilted, or as the viewing angle changes.

In FIG. 7A, the frequency of each stitched icon is equal to 4. In other words, the stitched icon is represented by two (2) slices from each icon design. As such, and referring now to FIG. 7B, the inventive security device 12 will successively project the pentagon array 26 and then the circle array 28 at twice the rate of the devices shown in FIGS. 4 to 6.

Figures 8A, 8B:
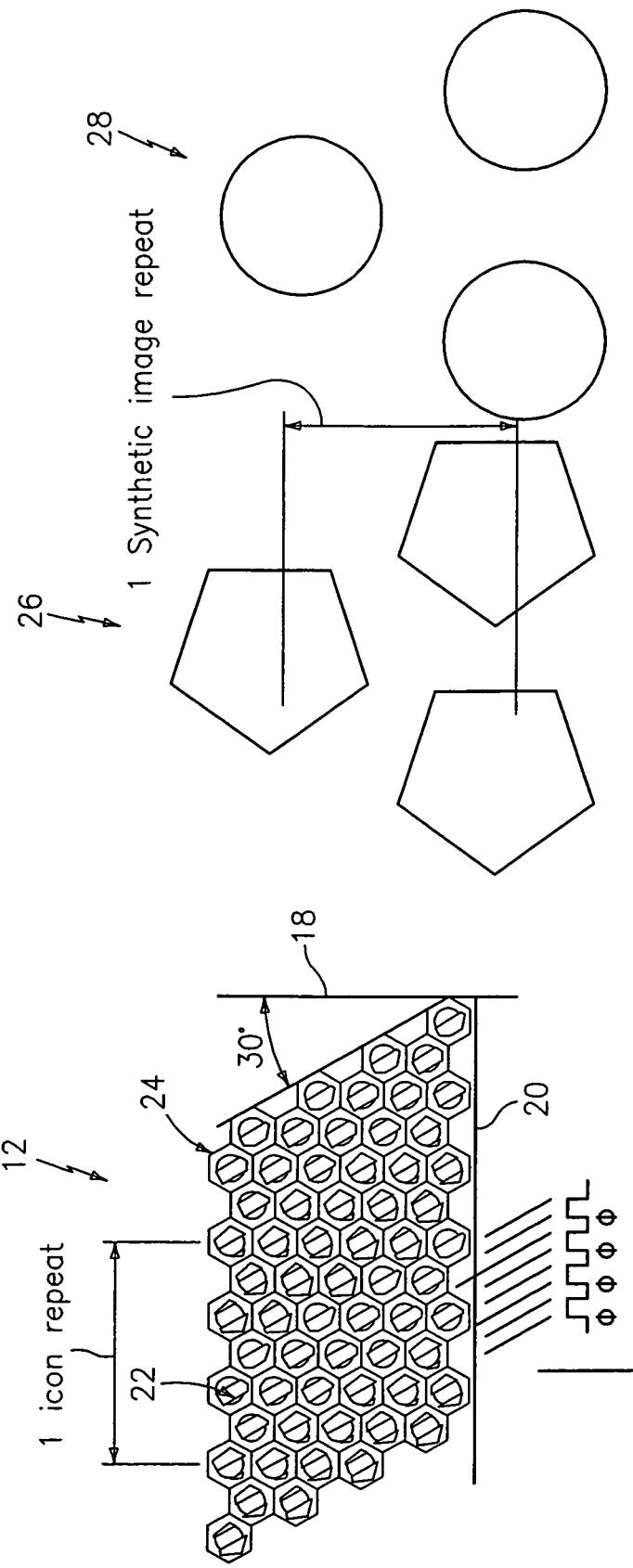

In FIG. 8A, the rows in which the stitched icons are arranged are parallel to short axis 20, while the columns as well as the stitched icons are at a 30° angle relative to long axis 18. Those portions of the icon designs embodied in the slices in the stitched icons change or transition across each row. As in prior examples, the frequency of the stitched icons is equal to 2, the ratio of the repeat period of the stitched icons to the repeat period of the microlenses in at least one direction is greater than 1, and the axis of symmetry of the planar array of stitched icons 22 and the corresponding axis of symmetry of the planar array of microlenses 24 are aligned. As such, and referring now to FIG. 8B, the inventive security device 12 will successively project an array of pentagons 26 and then an array of circles 28 that appear to lie on a spatial plane above a surface of the security device 12 as the device is tilted either horizontally or vertically, or as the viewing angle changes along either one of these planes.

Figures 9A, 9B:
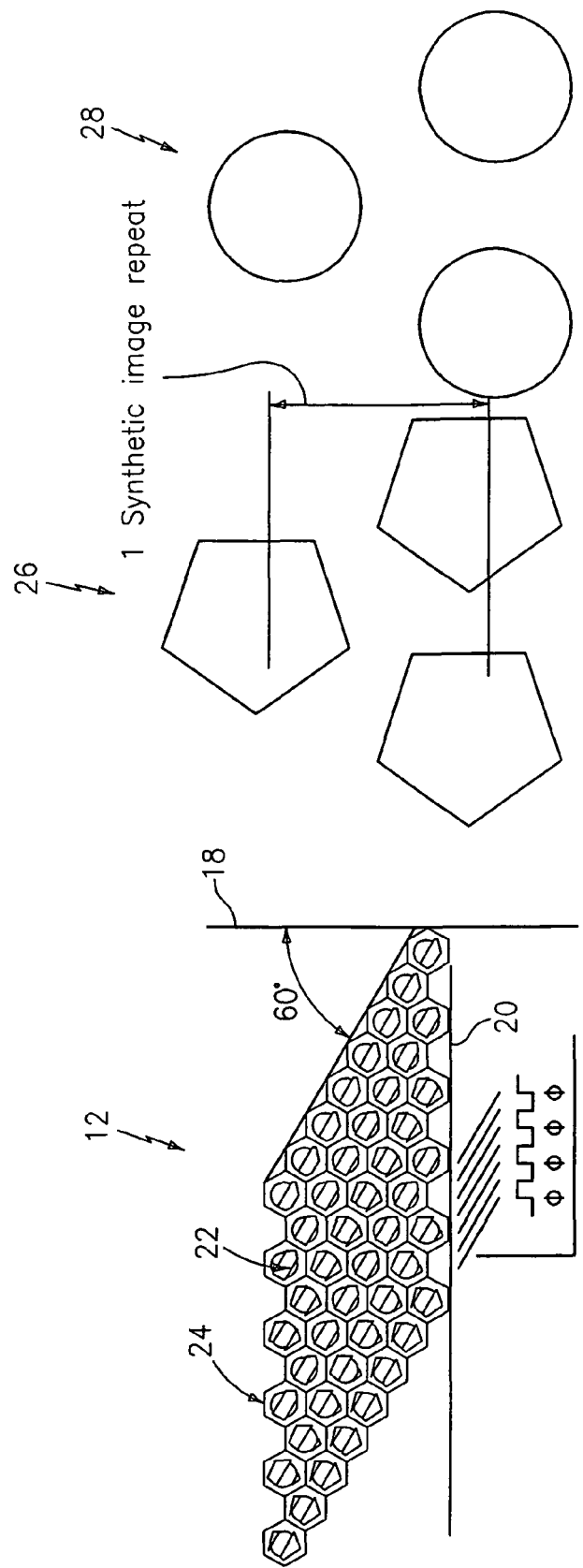
Figure 10A:
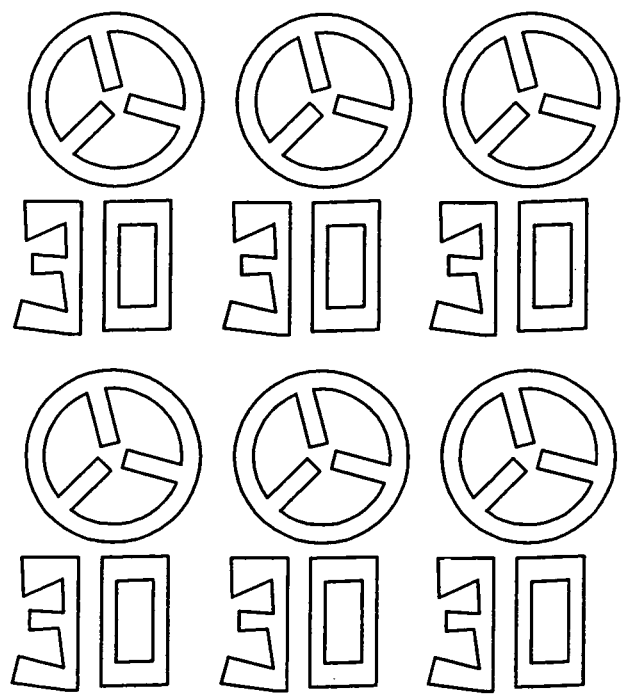
FIG. 10 are plan views of synthetically magnified images that are simultaneously projected by embodiments of the inventive micro-optic security device which employ stitched icons made up of one or more abutting or slightly overlapping slices.
Figure 10B:
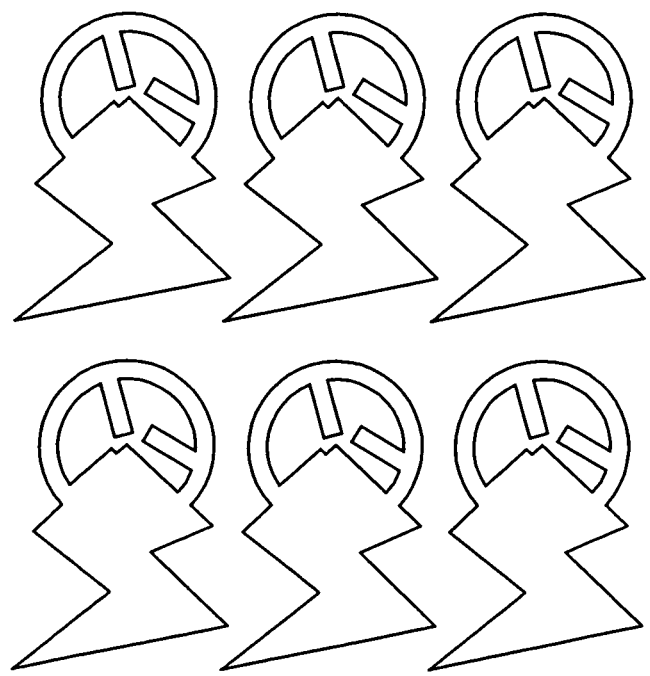

In FIG. 9A, the columns and the stitched icons are at a 60° angle relative to long axis 18.

FIGS. 10 to 15 depict "super" icons, which are projected by the inventive security device when the stitched icons are formed using abutting or slightly overlapping slices. As shown in FIGS. 10A-B, the synthetically magnified images that are simultaneously projected by the inventive security device may be arranged side-by-side to form, for example, a unique pattern or a legible phrase, or may be linked together to form a single, larger, more detailed image.

In FIG. 11A, the frequency of the stitched icons is equal to 2. In other words, each stitched icon is made up of one slice from two different icon designs (a pentagon array and a circle array). Those portions of the icon design embodied in each slice in each stitched icon changes or transitions down each column. As in prior examples, the ratio of the repeat period of the stitched icons to the repeat period of the microlenses in at least one direction is greater than 1, and the axis of symmetry of the planar array of stitched icons and the corresponding axis of symmetry of the planar array of microlenses are aligned. As such, and referring now to FIG. 11B, the inventive security device 30 will simultaneously project both pentagons and circles in alternating rows in an array 32 that appears to lie on a spatial plane above a surface of the security device 30 as the device is tilted horizontally, or as the viewing angle changes along this plane. In addition, these rows of synthetic images will appear to rapidly switch or trade places as the device is tilted, or as the viewing angle changes.

Figure 12B:
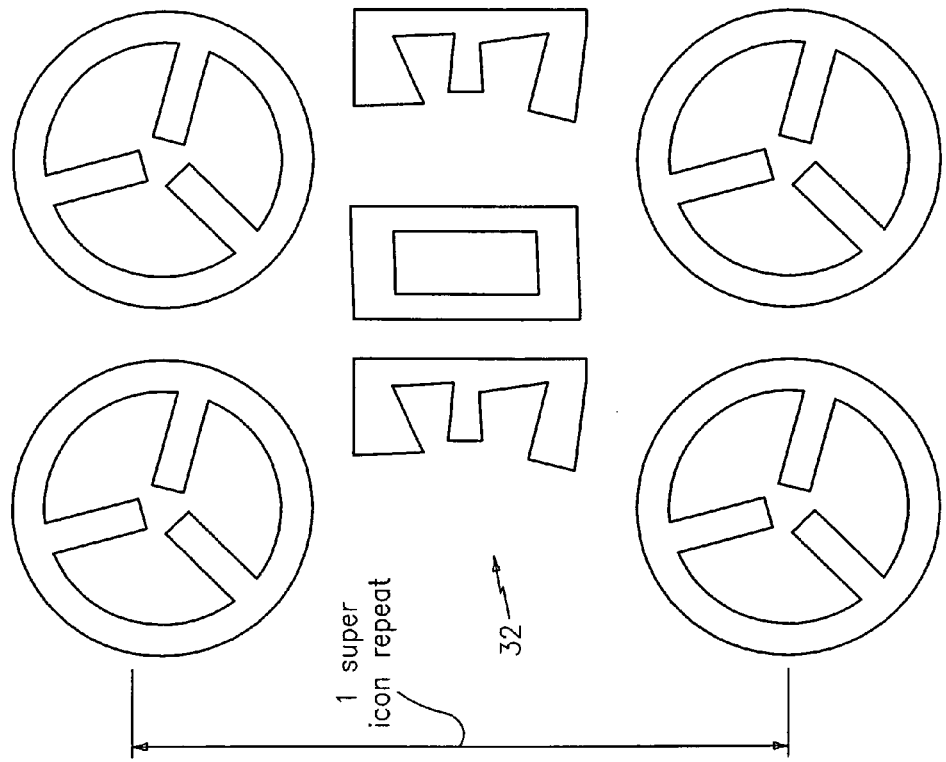
Figure 12A:
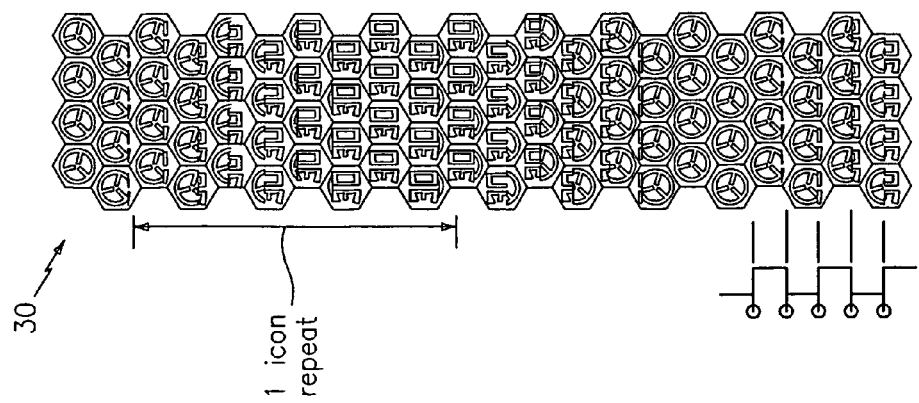

In FIG. 12A, the icon designs are in the form of a Mercedes symbol and the numeral 30. The frequency of the stitched icons is again equal to 2, with those portions of the icon designs embodied in the slices in each stitched icon changing or transitioning down each column. The projected image array 32 is shown in FIG. 12B.

In FIG. 13A, the axis of symmetry of the planar array of stitched icons and the corresponding axis of symmetry of the planar array of microlenses are rotationally misaligned. As such, and referring now to FIG. 13B, the inventive security device 30 will simultaneously project both Mercedes symbols and numerals in alternating rows in an array 32 that appears to move orthoparallactically as the device is tilted horizontally, or as the viewing angle changes along this plane. In addition, these rows of images will appear to rapidly switch or trade places as the device is tilted, or as the viewing angle changes.

Figures 14A, 14B:
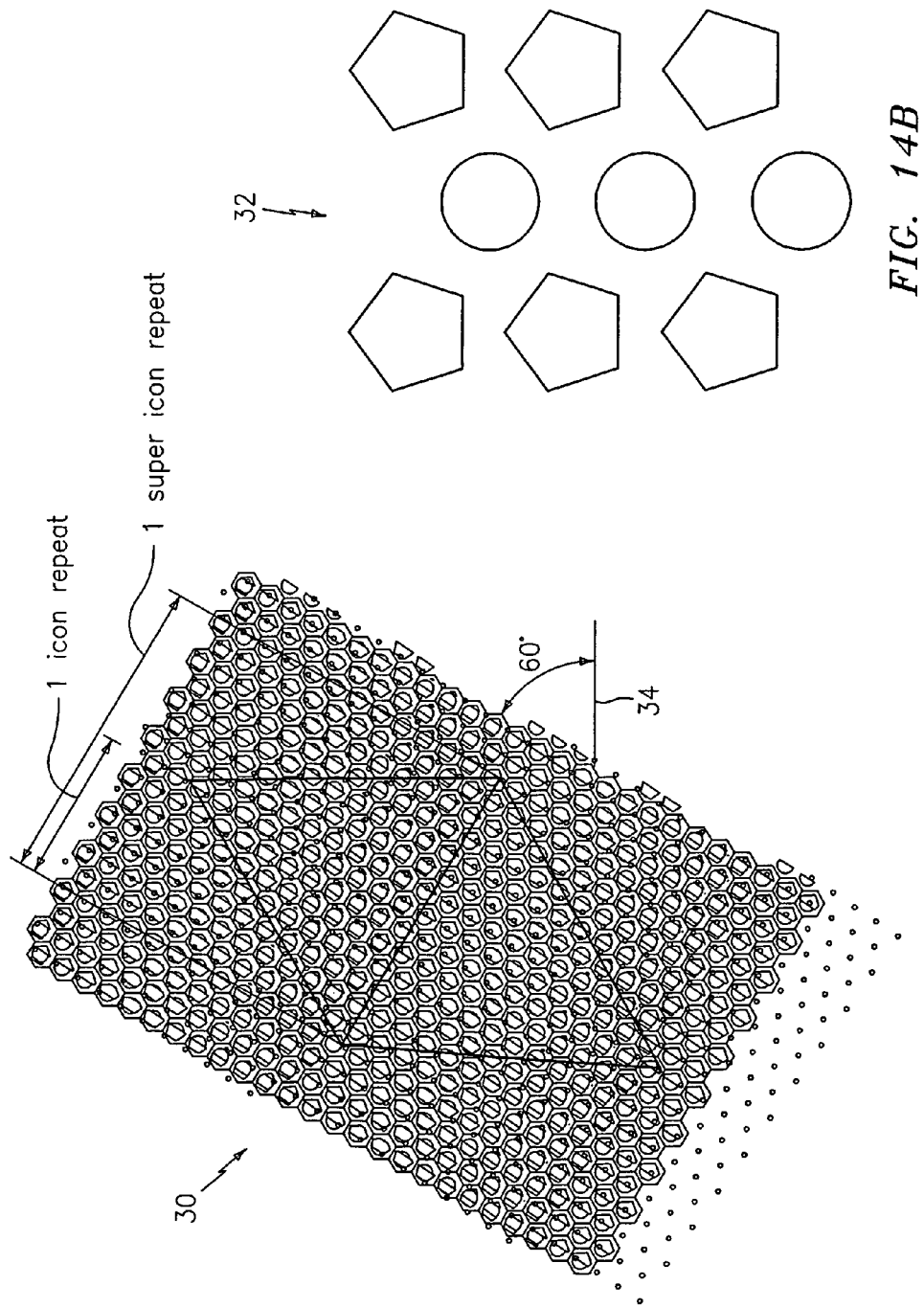

In FIG. 14A, the stitched icons and the array in which the stitched icons are arranged are at a 60° angle relative to short axis 34. Those portions of the icon designs embodied in the slices in the stitched icons change or transition down each column. As in the previous examples, the frequency of the stitched icons is equal to 2, the ratio of the repeat period of the stitched icons to the repeat period of the microlenses in at least one direction is greater than 1, and the axis of symmetry of the planar array of stitched icons and the corresponding axis of symmetry of the planar array of microlenses are rotationally misaligned. As such, and referring now to FIG. 14B, the inventive security device 30 will simultaneously project an array 32 of alternating columns of pentagons and circles that appear to move orthoparallactically as the device is tilted either horizontally or vertically, or as the viewing angle changes along either one of these planes. Again, these image columns will also appear to rapidly switch or trade places as the device is tilted, or as the viewing angle changes.

Figure 15B:
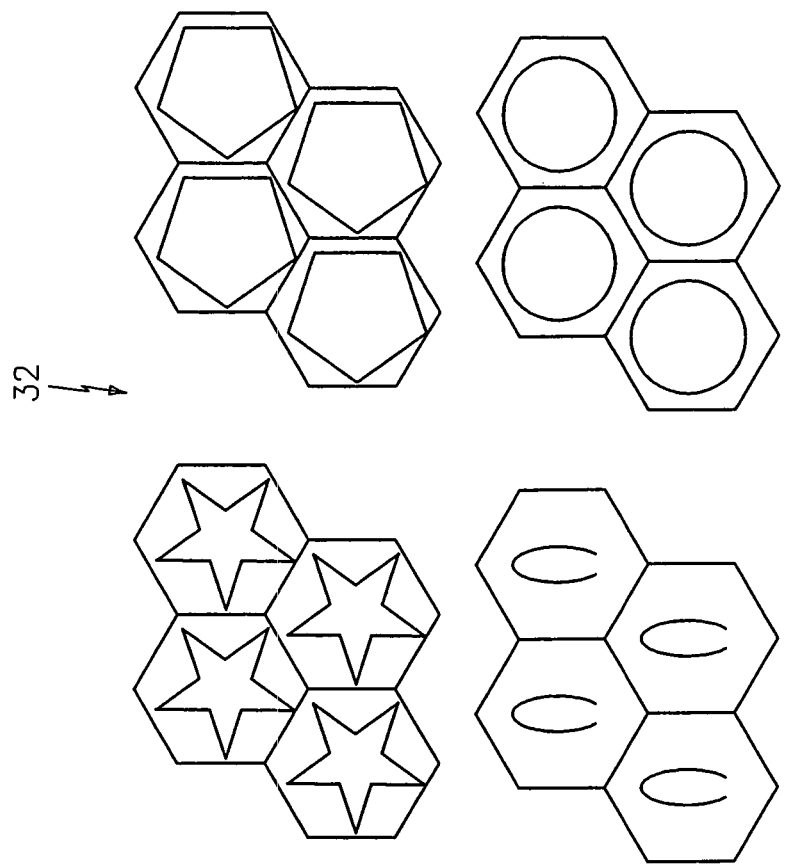
Figure 15A:
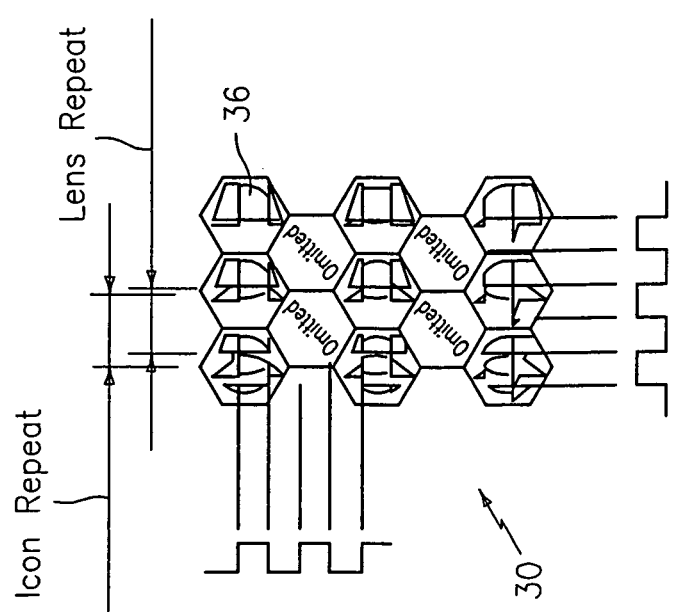

In FIG. 15A, each stitched icon 36 is made up of slices from four icon designs in the form of a star array, a pentagon array, a horseshoe array, and a circle array. The frequency of the stitched icons is equal to 4. Portions of the icon designs that are embodied in the slices in each stitched icon change or transition down each column and across each row. As in prior examples, the ratio of the repeat period of the stitched icons to the repeat period of the microlenses in at least one direction is greater than 1, and the axis of symmetry of the planar array of stitched icons and the corresponding axis of symmetry of the planar array of microlenses are aligned. As such, and referring to FIG. 15B, as the device is tilted horizontally (or as the viewing angle changes along this plane), the inventive security device 30 will simultaneously project an array of stars and an array of pentagons, and then an array of horseshoes and an array of circles. As the device is tilted vertically (or as the viewing angle changes along this plane), it will simultaneously project an array of stars and an array of horseshoes, and then an array of pentagons and an array of circles.

Figure 16:
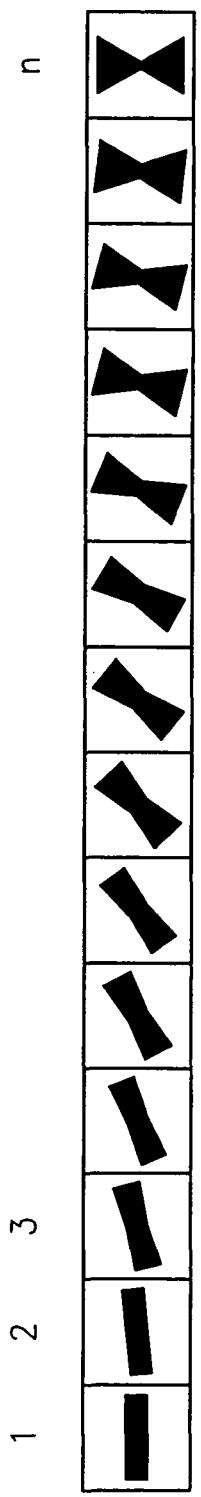
FIG. 16 is a plan view of a sequence of frames showing a synthetically magnified image that appears to move as it changes from one form to another form.

In FIG. 16, a series of frames is shown in which a synthetically magnified image appears to move as it changes from one form to another form. Such animation or apparent movement can be achieved by, for example, using fluid or evolving designs and by increasing the number of slices (e.g., greater than 25 slices) of those designs that are used to form the stitched icons.

The micro-optic security device 12, 30 of the present invention is preferably prepared using a radiation cured casting process. Such a process is described in U.S. Pat. No. 7,333,268 to Steenblik et al. By way of example, for those embodiments of security device 12, 30, which comprise a substrate having an array of stitched icons made up of slices in the form of filled recesses and an array of microlenses on opposing surfaces thereof, the radiation cured casting process would comprise:

(a) applying a substantially transparent or clear radiation curable resinous material to opposing upper and lower surfaces of the substrate;

(b) forming a planar array of microlenses on the upper surface and a planar array of stitched icons in the form of recessed slices on the lower surface of the substrate;

(c) curing the substantially transparent or clear radiation curable resin using a source of radiation; and (d) filling the recessed slices with a pigmented resin or ink.

The total thickness of the inventive micro-optic security device 12, 30 is preferably less than 50 microns (more preferably, less than 45 microns, and most preferably, from about 10 to about 40 microns).

The micro-optic security device 12, 30 of the present invention may include one or more additional security features or devices, coatings, or layers; provided however that any such additional security feature or device, coating, or layer does not result in an unacceptable increase in thickness or interfere with the optical effects or visual perception of the synthetic images projected by security device 12, 30. Contemplated additional security features or devices, coatings, or layers include, but are not limited to, light converting, magnetic, metal or metallic, and non-metallic conductive security features or devices, sealing or obscuring layers, outer protective layers, and one or more light-transmitting adhesive layers on the backside of device 12, 30 that facilitates the incorporation of device 12, 30 into or onto security documents, or consumer products.

As alluded to above, the security document 14 of the present invention is preferably a security paper and the micro-optic security device 12, 30, which is preferably in the form of a security thread, is partially embedded within or mounted on a surface of the paper. For partially embedded threads, portions thereof are exposed at the surface of the paper at spaced intervals along the length of the thread at windows or apertures in the paper.

The micro-optic security device 12, 30 in the form of a security thread may be at least partially incorporated in security papers during manufacture by techniques commonly employed in the papermaking industry. For example, the inventive security thread may be fed into a cylinder mold papermaking machine, cylinder vat machine, or similar machine of known type, resulting in total or partial embedment of the thread within the body of the finished paper.

The micro-optic security device 12, 30 of the present invention may be mounted on a surface of a security document or label either during or post manufacture. Mounting of the device 12, 30 may be achieved by any number of known techniques including: applying a pressure-sensitive adhesive to a surface of the device 12, 30 opposite the microlens layer(s) surface (i.e., the backside of device 12, 30) and pressing the device 12, 30 to the surface of the document or label; and applying a heat activated adhesive to the backside of the device 12, 30 and applying the device 12, 30, using thermal transfer techniques, to the surface of the document or label.

In a preferred embodiment, the security documents or labels of the present invention are porous and are rendered soil and/or moisture resistant by a method comprising:

(a) applying a soil and/or moisture resistant formulation to opposing surfaces of the porous document or label; and (b) employing a size press (e.g., puddle or metering) or other similar device to force the soil and/or moisture resistant formulation into the pores of document or label and to remove excess formulation from opposing surfaces of the document or label, thereby leaving exposed surfaces of the micro-optic security device 12, 30 substantially free of the soil and/or moisture resistant formulation.

Soil and/or moisture resistant formulations contemplated for use in the present invention are preferably prepared as aqueous formulations (e.g., dispersions) containing components found in prior art pre-print coatings and post-print varnishes. Included among these components are thermoplastic resins such as resins having an ester bond (e.g., polyester resins, styrene acrylate resins, polyether resins), optionally functionalized polyurethane resins (e.g., carboxylated polyurethane resins), and copolymers (e.g., urethane-acrylic copolymers) and mixtures thereof.

While various embodiments of the inventive stitched icon and micro-optic security device have been described herein, it should be understood that they have been presented by way of example only, and not limitation. Thus, the breadth and scope of the present invention should not be limited by any of the exemplary embodiments.

Having thus described the invention, what is claimed is:

1. A micro-sized stitched icon, which comprises slices from one or more icon designs, wherein each slice is spaced slightly apart from, abuts, or slightly overlaps an adjacent slice(s).

2. A stitched icon, which comprises slices from one or more icon designs, wherein each slice is spaced slightly apart from, abuts, or slightly overlaps an adjacent slice(s), wherein the stitched icon is a micron-sized stitched icon.

3. The stitched icon of claim 2, which measures from about 15 to about 30 microns in total height and from about 15 to about 30 microns in total width.

4. The stitched icon of claim 1, wherein each slice is spaced slightly apart from an adjacent slice(s).

5. The stitched icon of claim 1, wherein each slice abuts or slightly overlaps an adjacent slice(s).

6. A security device that comprises one or more arrangements of micro-sized stitched icons, each stitched icon comprising slices from one or more icon designs, wherein each slice is spaced slightly apart from, abuts, or slightly overlaps an adjacent slice(s).

7. A security device that comprises one or more arrangements of micro-sized stitched icons, each stitched icon comprising slices from one or more icon designs, wherein each slice is spaced slightly apart from, abuts, or slightly overlaps an adjacent slice(s), and further comprises one or more arrangements of microlenses, the arrangements of microlenses and stitched icons cooperating to form one or more synthetically magnified images.

8. The security device of claim 7, wherein each stitched icon comprises slices from two or more icon designs, and wherein each slice in each stitched icon abuts or slightly overlaps an adjacent slice(s), the security device thereby simultaneously projecting two or more synthetically magnified images.

9. The security device of claim 7, wherein each stitched icon comprises slices from two or more icon designs, and wherein each slice in each stitched icon is spaced slightly apart from an adjacent slice(s), the security device thereby successively projecting two or more synthetically magnified images as the device is tilted or viewed from different viewing angles.

10. The security device of claim 8, wherein the two or more projected images each have an optical effect, which may be the same or different, the optical effect being selected from the group of:

(i) showing movement as the security device is tilted or viewed from different viewing angles;

(ii) appearing to lie on a spatial plane deeper than the thickness of the security device;

(iii) appearing to lie on a spatial plane above a surface of the security device;

(iv) oscillating between a spatial plane deeper than the thickness of the security device and a spatial plane above a surface of the security device as the device is azimuthally rotated;

(v) transforming from one form, shape, size and/or color into a different form, shape, size and/or color as the security device is either azimuthally rotated or viewed from different viewpoints; and/or (vi) appearing as a three-dimensional image(s).

11. The security device of claim 7, which comprises a substrate, one or more arrangements of stitched icons on or within a surface of the substrate, each stitched icon comprising slices from two or more icon designs, and one or more arrangements of microlenses disposed substantially parallel to the arrangement(s) of stitched icons at a distance sufficient for the microlenses to form one or more synthetically magnified images.

12. The security device of claim 11, wherein the security device comprises:

(a) an elongated substrate having a long axis and a short axis;

(b) an array of stitched icons positioned on or within a surface of the substrate, the stitched icons arranged in a plurality of mutually perpendicular columns and rows, wherein the icon designs or portions thereof embodied in the slices that make up each stitched icon change or transition either down each column or across each row; and (c) a corresponding array of microlenses, disposed substantially parallel to the array of stitched icons with focal points of at least some of the microlenses being substantially aligned with slices in the stitched icons, wherein, the distance between the arrays is sufficient for the microlenses to form synthetically magnified images of the transitioning icon designs, and wherein, the synthetically magnified images smoothly transition from one form to at least one other form and then, optionally, back to the original form, as the device is tilted along its horizontal axis or as the device is tilted along its vertical axis.

13. The security device of claim 11, wherein the security device comprises:

(a) an elongated substrate having a long axis and a short axis;

(b) an angled array of similarly angled stitched icons positioned on or within a surface of the substrate, the stitched icons arranged in a plurality of mutually perpendicular columns and rows, wherein the icon designs or portions thereof embodied in the slices that make up each stitched icon change or transition either down each column or across each row; and (c) a corresponding array of microlenses, disposed substantially parallel to the array of stitched icons with focal points of at least some of the microlenses being substantially aligned with slices in the stitched icons, wherein, the distance between the arrays is sufficient for the microlenses to form synthetically magnified images of the transitioning icon designs, and wherein, the synthetically magnified images smoothly transition from one form to at least one other form and then, optionally, back to the original form, as the device is tilted along its horizontal axis and as the device is tilted along its vertical axis.

14. The security device of claim 12, wherein the arrays of stitched icons and microlenses each have a repeat period and an axis of symmetry within their respective arrays.

15. The security device of claim 14, wherein the ratio of the repeat period of the stitched icons to the repeat period of the microlenses in at least one direction is substantially equal to 1, and the axis of symmetry of the array of stitched icons and the corresponding axis of symmetry of the array of microlenses are angularly misaligned, thereby providing orthoparallactic motion effects for the synthetically magnified images of the transitioning icon designs.

16. The security device of claim 14, wherein the ratio of the repeat period of the stitched icons to the repeat period of the microlenses in at least one direction is greater than 1 and the axis of symmetry of the array of stitched icons and the corresponding axis of symmetry of the array of microlenses are aligned, thereby providing a floating effect for the synthetically magnified images of the transitioning icon designs.

17. The security device of claim 14, wherein the ratio of the repeat period of the stitched icons to the repeat period of the microlenses in at least one direction is less than 1 and the axis of symmetry of the array of stitched icons and the corresponding axis of symmetry of the array of microlenses are aligned, thereby providing a deep-set or sunken effect for the synthetically magnified images of the transitioning icon designs.

18. The security device of claim 6, which constitutes a security thread suitable for use on or at least partially within a security document.

19. The security device of claim 6, which constitutes a security patch suitable for use on a security document.

20. A security document or label having at least one security device at least partially embedded therein and/or mounted thereon, wherein the at least one security device comprises one or more arrangements of micro-sized stitched icons, each stitched icon comprising slices from one or more icon designs, wherein each slice is spaced slightly apart from, abuts, or slightly overlaps an adjacent slice(s).

21. A security document or label having at least one security device at least partially embedded therein and/or mounted thereon, wherein the at least one security device comprises one or more arrangements of micro-sized stitched icons, each stitched icon comprising slices from one or more icon designs, wherein each slice is spaced slightly apart from, abuts, or slightly overlaps an adjacent slice(s), wherein the at least one security device is a micro-optic security device that further comprises one or more arrangements of microlenses, the arrangements of microlenses and stitched icons cooperating to form one or more synthetically magnified images.

22. The security document of claim 21, wherein the micro-optic security device is a security thread that is partially embedded within the document and visible in windows on one or more surfaces thereof.

23. The security document of claim 22, wherein the security thread in each window projects images having the same optical effect.

24. The security document of claim 22, wherein the security thread in each window projects images having different optical effects.

25. The security document of claim 23, wherein the images projected by the security thread are coordinated with printed images on one or more surfaces of the document.

26. The security device of claim 9, wherein the two or more projected images each have an optical effect, which may be the same or different, the optical effect being selected from the group of:

(i) showing movement as the security device is tilted or viewed from different viewing angles;
(ii) appearing to lie on a spatial plane deeper than the thickness of the security device;
(iii) appearing to lie on a spatial plane above a surface of the security device;
(iv) oscillating between a spatial plane deeper than the thickness of the security device and a spatial plane above a surface of the security device as the device is azimuthally rotated;
(v) transforming from one form, shape, size and/or color into a different form, shape, size and/or color as the security device is either azimuthally rotated or viewed from different viewpoints; and/or
(vi) appearing as a three-dimensional image(s).

27. The security device of claim 13, wherein the arrays of stitched icons and microlenses each have a repeat period and an axis of symmetry within their respective arrays.

28. The security device of claim 27, wherein the ratio of the repeat period of the stitched icons to the repeat period of the microlenses in at least one direction is substantially equal to 1, and the axis of symmetry of the array of stitched icons and the corresponding axis of symmetry of the array of microlenses are angularly misaligned, thereby providing orthoparallactic motion effects for the synthetically magnified images of the transitioning icon designs.

29. The security device of claim 27, wherein the ratio of the repeat period of the stitched icons to the repeat period of the microlenses in at least one direction is greater than 1 and the axis of symmetry of the array of stitched icons and the corresponding axis of symmetry of the array of microlenses are aligned, thereby providing a floating effect for the synthetically magnified images of the transitioning icon designs.

30. The security device of claim 27, wherein the ratio of the repeat period of the stitched icons to the repeat period of the microlenses in at least one direction is less than 1 and the axis of symmetry of the array of stitched icons and the corresponding axis of symmetry of the array of microlenses are aligned, thereby providing a deep-set or sunken effect for the synthetically magnified images of the transitioning icon designs.

31. The security document of claim 24, wherein the images projected by the security thread are coordinated with printed images on one or more surfaces of the document.

32. A security device which comprises:
(a) a substrate;
(b) an array of micro-stitched icons positioned on or within a surface of the substrate, each stitched icon comprising slices from two or more icon designs, the stitched icons arranged in a plurality of mutually perpendicular columns and rows, wherein the icon designs or portions thereof embodied in the slices that make up each stitched icon transition either down each column or across each row; and
(c) a corresponding array of microlenses, disposed substantially parallel to the array of stitched icons with focal points of at least some of the microlenses being substantially aligned with slices in the stitched icons,
wherein the distance between the arrays is sufficient for the microlenses to form synthetically magnified images of the transitioning icon designs, and
wherein the synthetically magnified images smoothly transition from one form to at least one other form as the device is tilted along its horizontal axis or as the device is tilted along its vertical axis.

33. A security device which comprises:
(a) a substrate;
(b) an angled array of similarly angled micro-stitched icons positioned on or within a surface of the substrate, each stitched icon comprising slices from two or more icon designs, the stitched icons arranged in a plurality of mutually perpendicular columns and rows, wherein the icon designs or portions thereof embodied in the slices that make up each stitched icon transition either down each column or across each row; and
(c) a corresponding array of microlenses, disposed substantially parallel to the array of stitched icons with focal points of at least some of the microlenses being substantially aligned with slices in the stitched icons,
wherein the distance between the arrays is sufficient for the microlenses to form synthetically magnified images of the transitioning icon designs, and
wherein the synthetically magnified images smoothly transition from one form to at least one other form as the device is tilted along its horizontal axis and as the device is tilted along its vertical axis.

34. The security device of claim 32, wherein the synthetically magnified images smoothly transition from one form to at least one other form and then back to the original form as the device is tilted along its horizontal axis or as the device is tilted along its vertical axis.

35. The security device of claim 33, wherein the synthetically magnified images smoothly transition from one form to at least one other form and then back to the original form as the device is tilted along its horizontal axis and as the device is tilted along its vertical axis.

36. The security device of claim 32 or 33, wherein:
(a) the ratio of a repeat period of the stitched icons to the repeat period of the microlenses in at least one direction is greater than 1 and the axis of symmetry of the array of stitched icons and the corresponding axis of symmetry of the array of microlenses are aligned, thereby providing a floating effect for the synthetically magnified images of the transitioning icon designs;
(b) the ratio of a repeat period of the stitched icons to the repeat period of the microlenses in at least one direction is less than 1 and the axis of symmetry of the array of stitched icons and the corresponding axis of symmetry of the array of microlenses are aligned, thereby providing a deep-set or sunken effect for the synthetically magnified images of the transitioning icon designs; or
(c) the ratio of a repeat period of the stitched icons to the repeat period of the microlenses in at least one direction is substantially equal to 1, and an axis of symmetry of the array of stitched icons and the corresponding axis of symmetry of the array of microlenses are rotationally misaligned, thereby providing orthoparallactic motion effects for the synthetically magnified images of the transitioning icon designs.

37. The security device of claim 32 or 33, wherein each slice in each stitched icon abuts or slightly overlaps an adjacent slice(s), the security device thereby simultaneously projecting two or more synthetically magnified images.

38. The security device of claim 32 or 33, wherein each slice in each stitched icon is spaced slightly apart from an adjacent slice(s), the security device thereby successively projecting two or more synthetically magnified images as the device is tilted or viewed from different viewing angles.

39. A security document or label having at least one security device according to claim 32 or 33 being at least partially embedded therein and/or mounted thereon.

40. The security document or label of claim 39, wherein the images projected by the security thread are coordinated with printed images on one or more surfaces of the document.

41. The security device of claim 7, wherein the one or more icon designs embodied in the stitched icons and the one or more arrangements of microlenses each have a size and a period, wherein the size and the period in the x and/or y directions of the one or more icon designs are either equal to or larger than the size and the period in the x and/or y directions of the one or more arrangements of microlenses.

42. The security device of claim 41, wherein there is a one-to-one correspondence between the one or more icon designs embodied in the stitched icons and the microlenses.

43. The security device of claim 41, wherein there is not a one-to-one correspondence between the one or more icon designs embodied in the stitched icons and the microlenses.

* * * * *

UNITED STATES PATENT AND TRADEMARK OFFICE
CERTIFICATE OF CORRECTION

| | | |
|---|---|---|
| PATENT NO. | : 8,739,711 B2 | Page 1 of 1 |
| APPLICATION NO. | : 12/671245 | |
| DATED | : June 3, 2014 | |
| INVENTOR(S) | : Paul F. Cote | |

It is certified that error appears in the above-identified patent and that said Letters Patent is hereby corrected as shown below:

Title page, under (73) Assignee, change "Crane Security Technology, Inc., Nashua, NH (US)" to --Crane Security Technologies, Inc., Nashua, NH (US)--.

Signed and Sealed this
Eleventh Day of November, 2014

Michelle K. Lee
*Deputy Director of the United States Patent and Trademark Office*